United States Patent
Kamalakaran et al.

(10) Patent No.: US 8,309,655 B2
(45) Date of Patent: *Nov. 13, 2012

(54) METHODS FOR THE PREPARATION OF A POLY(ARYLENE ETHER) POLYSILOXANE MULTIBLOCK COPOLYMER, MULTIBLOCK COPOLYMERS PRODUCED THEREBY, AND ASSOCIATED COMPOSITIONS AND ARTICLES

(75) Inventors: Radha Kamalakaran, Karnatake (IN); Veeraraghavan Srinivasan, Karnataka (IN); Rajesh Chowdhury, West Bengal (IN); Vivek Vasant Karambelkar, Karnataka (IN)

(73) Assignee: SABIC Innovative Plastics IP B.V. (NL)

( * ) Notice: Subject to any disclaimer, the term of this patent is extended or adjusted under 35 U.S.C. 154(b) by 128 days.

This patent is subject to a terminal disclaimer.

(21) Appl. No.: 12/644,144

(22) Filed: Dec. 22, 2009

(65) Prior Publication Data
US 2011/0152471 A1    Jun. 23, 2011

(51) Int. Cl.
*C08G 77/04* (2006.01)
(52) U.S. Cl. ..... 525/88; 525/92 A; 525/92 B; 525/92 D; 525/95; 525/101
(58) Field of Classification Search .............. 525/92 A, 525/393, 88
See application file for complete search history.

(56) References Cited

U.S. PATENT DOCUMENTS

| | | | |
|---|---|---|---|
| 2,071,250 A | 7/1931 | Carothers |
| 2,071,251 A | 2/1937 | Carothers |
| 2,130,523 A | 9/1938 | Carothers |
| 2,130,948 A | 9/1938 | Carothers |
| 2,241,322 A | 5/1941 | Hanford |
| 2,312,966 A | 3/1943 | Hanford |
| 2,465,319 A | 3/1949 | Whinfield |
| 2,512,606 A | 6/1950 | Bolton et al. |
| 2,720,502 A | 10/1955 | Caldwell |
| 2,727,881 A | 12/1955 | Caldwell |
| 2,822,348 A | 2/1958 | Haslam |
| 3,047,539 A | 7/1962 | Pengilly |
| 3,379,792 A | 4/1968 | Finholt |
| 3,671,487 A | 6/1972 | Abolins |
| 3,716,589 A | 2/1973 | Kotanigawa et al. |
| 3,953,394 A | 4/1976 | Fox et al. |
| 3,979,464 A | 9/1976 | Leach |
| 4,128,526 A | 12/1978 | Borman |
| 4,128,728 A | 12/1978 | Arnold et al. |
| 4,226,761 A | 10/1980 | Cooper et al. |
| 4,283,574 A | 8/1981 | Leach |
| 4,301,308 A | 11/1981 | Canavesi et al. |
| 4,546,093 A | 10/1985 | Chang et al. |
| 4,664,972 A | 5/1987 | Connolly |
| 4,769,424 A | 9/1988 | Takekoshi et al. |
| 4,814,392 A | 3/1989 | Shea et al. |
| 4,822,836 A | 4/1989 | Wroczynski |
| 4,871,816 A | 10/1989 | Percec et al. |
| 4,879,346 A | 11/1989 | Bopp et al. |
| 4,970,272 A | 11/1990 | Gallucci |
| 5,021,543 A | 6/1991 | Mayska et al. |
| 5,032,635 A | 7/1991 | Avakian et al. |
| 5,061,746 A | 10/1991 | Gallucci et al. |
| 5,110,896 A | 5/1992 | Waggoner et al. |
| 5,132,365 A | 7/1992 | Gallucci |
| 5,169,887 A | 12/1992 | Snow et al. |
| 5,204,438 A | 4/1993 | Snow et al. |
| 5,258,455 A | 11/1993 | Laughner et al. |
| 5,281,686 A | 1/1994 | Blohm et al. |
| 5,294,655 A | 3/1994 | Lee, Jr. et al. |
| 5,357,003 A | 10/1994 | Smits et al. |
| 5,357,022 A | 10/1994 | Banach et al. |
| 5,364,898 A | 11/1994 | Lee et al. |
| 5,385,984 A | 1/1995 | Blohm et al. |
| 5,470,913 A | 11/1995 | van der Meer et al. |
| 5,484,858 A | 1/1996 | Smits et al. |
| 5,596,048 A | 1/1997 | Blohm et al. |
| 5,612,425 A | 3/1997 | Weber et al. |
| 5,625,011 A | 4/1997 | Palsule |
| 5,693,700 A | 12/1997 | Venkataramani et al. |
| 5,714,550 A | 2/1998 | Shaw |
| 5,817,891 A | 10/1998 | Brocker et al. |
| 5,916,952 A | 6/1999 | Romenesko et al. |
| 6,025,419 A | 2/2000 | Kasowski et al. |
| 6,072,011 A | 6/2000 | Hoover |
| 6,339,131 B1 | 1/2002 | Cella et al. |
| 6,593,411 B2 | 7/2003 | Koevoets et al. |
| 7,115,677 B2 | 10/2006 | Harashina et al. |
| 7,166,243 B2 | 1/2007 | Elkovitch et al. |
| 7,329,708 B2 | 2/2008 | Birsak et al. |
| 7,449,507 B2 | 11/2008 | Fishburn |
| 7,488,766 B2 | 2/2009 | Peters et al. |
| 7,534,822 B2 | 5/2009 | Elkovitch et al. |

(Continued)

FOREIGN PATENT DOCUMENTS

CA    2052488    4/1992

(Continued)

OTHER PUBLICATIONS

Ablemarle, Saytex HP-3010 Flame Retardant, Feb. 2008, 2 pages.
Allen and Hendrick, Synthesis and properties of xylenyl ether-dimethylsiloxane triblock polymers, Polymer Bulletin, vol. 19, pp. 103-110 (1988).
ASTM D2240-05, Standard Test Method for Rubber Property—Durometer Hardness, Downloaded Feb. 26, 2007, 13 pages.
ASTM D2857-95, Standard Practice for Dilute Solution Viscosity of Polymers (Reapproved 2001), 6 pages.
ASTM D638, Standard Test Method for Tensile Properties of Plastics, Downloaded Jul. 25, 2007, 15 pages.
ASTM D648-07, Standard Test Method for Deflection Temperature of Plastics Under Flexural Load in the Edgewise Position, Downloaded Jan. 12, 2009, 13 pages.

(Continued)

*Primary Examiner* — Jeffrey Mullis
(74) *Attorney, Agent, or Firm* — Cantor Colburn LLP

(57) ABSTRACT

A poly(arylene ether)-polysiloxane multiblock copolymer is prepared by the reaction of a hydroxy-diterminated poly (arylene ether), a hydroxyaryl-diterminated polysiloxane, and an aromatic diacid chloride. This synthesis overcomes disadvantages of known syntheses of poly(arylene ether)-polysiloxane block copolymers. The poly(arylene ether)-polysiloxane multiblock copolymer is useful for improving the melt processability of poly(arylene ether) compositions.

38 Claims, 4 Drawing Sheets

U.S. PATENT DOCUMENTS

| | | | |
|---|---|---|---|
| 7,541,421 | B2 | 6/2009 | Carrillo et al. |
| 7,576,150 | B2 | 8/2009 | Klei et al. |
| 7,592,382 | B2 | 9/2009 | Borade et al. |
| 7,608,651 | B2 | 10/2009 | Borade et al. |
| 7,803,856 | B2 | 9/2010 | Perego et al. |
| 7,816,438 | B2 | 10/2010 | Seki et al. |
| 7,847,032 | B2 | 12/2010 | Guo et al. |
| 8,017,697 | B2 | 9/2011 | Carrillo et al. |
| 2004/0260036 | A1 | 12/2004 | Fishburn |
| 2005/0171323 | A1 | 8/2005 | Kamps et al. |
| 2005/0250885 | A1 | 11/2005 | Mercx et al. |
| 2005/0261417 | A1 | 11/2005 | Mezzenga et al. |
| 2006/0058432 | A1 | 3/2006 | Perego et al. |
| 2006/0106139 | A1 | 5/2006 | Kosaka et al. |
| 2006/0111484 | A1 | 5/2006 | Fishburn |
| 2006/0111548 | A1 | 5/2006 | Elkovitch et al. |
| 2006/0149000 | A1 | 7/2006 | Ikuta et al. |
| 2006/0167143 | A1 | 7/2006 | Borade et al. |
| 2006/0182967 | A1 | 8/2006 | Kosaka et al. |
| 2007/0100088 | A1 | 5/2007 | Gallucci et al. |
| 2007/0112132 | A1 | 5/2007 | Zhao et al. |
| 2007/0208144 | A1 | 9/2007 | Delsman et al. |
| 2007/0208159 | A1 | 9/2007 | McCloskey et al. |
| 2007/0244231 | A1 | 10/2007 | Borade et al. |
| 2008/0071036 | A1 | 3/2008 | Delsman et al. |
| 2011/0152431 | A1 | 6/2011 | Elkovitch et al. |
| 2011/0190453 | A1 | 8/2011 | Carrillo et al. |
| 2011/0190454 | A1 | 8/2011 | Carrillo et al. |

FOREIGN PATENT DOCUMENTS

| | | | |
|---|---|---|---|
| EP | 0133641 | A1 | 3/1985 |
| EP | 683209 | A2 | 5/1995 |
| EP | 0714951 | A1 | 6/1996 |
| EP | 1253164 | A1 | 10/2002 |
| GB | 1353501 | A | 5/1974 |
| JP | 252214 | | 11/1986 |
| JP | 6200038 | | 7/1994 |
| WO | 87/07281 | A1 | 12/1987 |
| WO | 98/08898 | A1 | 3/1998 |
| WO | 01/40353 | A1 | 6/2001 |
| WO | 2007/106296 | A2 | 9/2007 |

OTHER PUBLICATIONS

ASTM D790, Standard Test Method for Flexural Properties of Unreinforced and Reinforced Plastics and Electrical Insulating Materials, Downloaded May 25, 2004, 11 pages.
Clariant Exolit OP 1312, Flame Retardants PHP, Edition Feb. 4, 2009, 2 pages.
Clariant Exolit Overview, Nov. 2008 Edition, 8 pages.
JP 2002047409, Publication date: Feb. 12, 2002, Abstract.
JP 2003105193, Publication date: Apr. 9, 2003, Abstract.
JP 2004231789, Publication date: Aug. 19, 2004, Abstract.
JP 2005333698, Publication date: Dec. 2, 2005.
JP 3126744, Publication date: May 29, 1991, Abstract.
JP 4077552, Publication date: Mar. 11, 1992, Abstract.
JP 57-195122, Publication date: Nov. 30, 1982, Abstract.
JP 61-252214, Publication date: Nov. 10, 1986, Abstract.
JP 6200015, Publication date: Jul. 19, 1994, Abstract.
JP 63202652, Publication date: Aug. 22, 1988, Abstract.
JP 9003322, Publication date: Jan. 7, 1997, Abstract.
JP 9279044, Publication date: Mar. 11, 1992, Abstract.
Pape et al., The Role of Silicone Powders in Reducing the Heat Release Rate and Evolution of Smoke in Flame Retardant Thermoplastics, Journal of Vinyl & Additive Technology, Sep. 1997, vol. 3, No. 3, Abstract, 1 page.
International Search Report, PCT/US2009/064110, Date of Mailing: May 27, 2010, 8 pages.
Skoog et al., Principles of Instrumental Analysis, 4th Edition, Saunders College Publishers, Harcourt Brace College Publishers, New York (1992), pp. 568-578.
Tests for Flammability of Plastic Materials for Parts in Devices and Appliances, Dec. 13, 2003, 52 pages.
Written Opinion and International Search Report, International Application No. PCT/US2009/045280; International Filing Date May 27, 2009.
Written Opinion of the International Searching Authority, International Application No. PCT/US2009/064110, International Filing Date: Nov. 12, 2009, 5 pages.
U.S. Appl. No. 12/331,802, filed Dec. 10, 2008; Non-Final Office Action dated Jan. 27, 2010; 7 pages.
U.S. Appl. No. 12/331,802, filed Dec. 10, 2008; Notice of Allowance dated May 27, 2010; 4 pages.
U.S. Appl. No. 12/331,802, filed Dec. 10, 2008; Notice of Allowance dated Jul. 2, 2010; 4 pages.
U.S. Appl. No. 12/331,802, filed Dec. 10, 2008; Notice of Allowance dated Aug. 23, 2010; 6 pages.
U.S. Appl. No. 12/331,802, filed Dec. 10, 2008.
U.S. Appl. No. 12/644,272, filed Dec. 22, 2009.
U.S. Appl. No. 12/277,835, filed Nov. 25, 2008.
U.S. Appl. No. 12/277,835, filed Nov. 25, 2008 Non-Final Office Action dated Jul. 14, 2010; 21 pages.
U.S. Appl. No. 12/277,835, Final Office Action dated: Dec. 1, 2010, 12 pages.
U.S. Appl. No. 12/644,272 Non-Final Office Action, notification date Jul. 18, 2011, 28 pages.
JP405230360A; Published Sep. 7, 1993; Kurasawa et al.; "Flame Retardant Resin Composition", Abstract; only one page.
PCT/US2010/058146 International Search Report, date of mailing Aug. 16, 2011, 5 pages.
PCT/US2010/058146 Written Opinion, date of mailing Aug. 16, 2011, 4 pages.
PCT/US2010/058166 International Search Report, date of mailing Aug. 17, 2011, 5 pages.
PCT/US2010/058166 Written Opinion, date of mailing Aug. 17, 2011, 4 pages.
U.S. Appl. No. 12/644,221, filed Dec. 22, 2009.
U.S. Appl. No. 13/043,502, filed Mar. 9, 2011.
U.S. Appl. No. 13/043,506, filed Mar. 9, 2011.
ASTM D3763-08 "Standard Test Method for High Speed Puncture Properties of Plastics Using Load and Displacement Sensors", 2008, 9 pages.
International Search Report and Written Opinion for PCT/IB2010/055482, mailing date May 13, 2011, 4 pages.
U.S. Appl. No. 13/043,502 Non-Final Rejection, notification date Jun. 2, 2011, 11 pages.
U.S. Appl. No. 12/644,221 Non-Final Rejection, notification date May 2, 2011, 31 pages.
Written Opinion for PCT/IB2010/055482, mailing date Nov. 29, 2010, 6 pages.
ASTM D1238, Standard Test Method for Melt Flow Rates of Thermoplastics by Extrusion Plastometer, Downloaded Jul 25, 2007.
Chan et al., Facile Quantitative Analysis of Hydroxyl End Groups of Poly(2,6-dimethyl-1, 4-phenylene oxide)s by PNMR Spectroscopy, Macromolecules, vol. 27 (22), 1994, Abstract, 1 page.
UL 1581, Underwriters Laboratories, Inc. (UL), Reference Standard for Electrical Wires, Cables, and Flexible Cords, 2003, 236 pages.
Weil et al., "Flame Retardants for Plastics and Textiles: Practical Applications", 2009, pp. 88-90.
Final Office Action for U.S. Appl. No. 12/644,272, Notification Date Dec. 15, 2011, 14 pages.
Final Office Action for U.S. Appl. No. 13/043,506, Notification Date Dec. 16, 2011, 12 pages.
Final Office Action for U.S. Appl. No. 13/043,502, Notification Date Dec. 16, 2011, 38 pages.
U.S. Appl. No. 12/644,221 Final Office Action, notification date Sep. 28, 2011, 21 pages.
U.S. Appl. No. 13/043,506 Non-Final Office Action, notification date Sep. 15, 2011, 37 pages.
U.S. Appl. No. 12/644,272 Non-Final Office Action, filed Dec. 22, 2009, Notification Date Jun. 6, 2012, 14 pages.
JP2004-231769A; Aug. 19, 2004; Machine Translation; 15 pages.

METHODS FOR THE PREPARATION OF A POLY(ARYLENE ETHER) POLYSILOXANE MULTIBLOCK COPOLYMER, MULTIBLOCK COPOLYMERS PRODUCED THEREBY, AND ASSOCIATED COMPOSITIONS AND ARTICLES

BACKGROUND OF THE INVENTION

Poly(arylene ether) resins are a class of plastics known for excellent water resistance, dimensional stability, and inherent flame retardancy, as well as high oxygen permeability and oxygen/nitrogen selectivity. One property challenge posed by poly(arylene ether) is its poor melt processability. The most common solution to the problem of poor melt processability is to blend the poly(arylene ether) with polystyrene or another styrenic resin. The disadvantage of this solution, however, is that such blending leads to inferior heat resistance, flame retardancy, and smoke generation relative to pure poly (arylene ether).

Other approaches involve the blending of poly(arylene ether)s with polysiloxanes in various forms. For example, as described in U.S. Pat. No. 5,916,952 to Romenesko et al., a poly(phenylene ether) can be blended with a free-flowing silicone rubber powder having an average particle size of 1 to 1000 microns and prepared by mixing a polydiorganosiloxane with a silica filler. However, these compositions can exhibit phase separation and inadequate flexibility.

Another example involves blending of poly(arylene ether) with polysiloxane-modified polystyrene to achieve improved processability along with improved mechanical properties. See U.S. Pat. No. 4,226,761 to Cooper et al. The polysiloxane-modified polystyrene is prepared by dissolving the polysiloxane in styrene and polymerizing the styrene. However, these compositions can exhibit poor flexibility.

Poly(arylene ether) compositions have also incorporated polysiloxane content in the form of poly(arylene ether)-polysiloxane block and graft copolymers. Syntheses of poly (arylene ether)-polysiloxane block and graft copolymers include the following four approaches. First, a graft copolymer has been synthesized by reaction of a lithiated poly (arylene ether) with a polydiorganosiloxane having a reactive group on one end. See Japanese Patent Application Publication No. JP 61-252214 of Matsui et al. Second, a graft copolymer has been synthesized by reaction of an anhydride-functionalized poly(arylene ether) with an amino-terminated polydiorganosiloxane. See U.S. Pat. No. 4,814,392 to Shea et al. Third, a block copolymer has been synthesized by reacting a poly(arylene ether) with a hydroxyaromatic-terminated or aromatic ether-terminated polysiloxane reagent in the presence of an oxidant. See U.S. Pat. No. 5,596,048 to Blohm et al. Fourth, a poly(arylene ether)-polysiloxane block copolymer has been synthesized by reaction of a poly(arylene ether), a hydroxyaryl-terminated polysiloxane, and an activated aromatic carbonate. See U.S. Patent Application Publication No. 2007/0208144 A1 of Delsman et al. These synthetic procedures have various disadvantages. In some cases, they require multiple synthetic steps and employ expensive and sensitive reagents and they are therefore not economically suited for commercial-scale syntheses. Also, some of the poly(arylene ether)-polysiloxane copolymer products exhibit poor thermal and hydrolytic stability, due to the presence of C—O—Si linkages. Furthermore, some of the product copolymers have undesirably low molecular weights.

There is therefore a desire for poly(arylene ether) copolymers that can be made by a simplified procedure and exhibit increased molecular weight and improved thermal and hydrolytic stability.

BRIEF DESCRIPTION OF THE INVENTION

One embodiment is a method of preparing a poly(arylene ether)-polysiloxane multiblock copolymer, comprising: reacting a hydroxy-diterminated poly(arylene ether), a hydroxyaryl-diterminated polysiloxane, and an aromatic diacid chloride to form a poly(arylene ether)-polysiloxane multiblock copolymer.

Another embodiment is a poly(arylene ether)-polysiloxane multiblock copolymer made according to the foregoing method.

Another embodiment is a poly(arylene ether)-polysiloxane multiblock copolymer, comprising: at least two poly(arylene ether) blocks having the structure

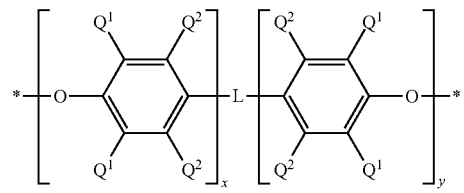

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

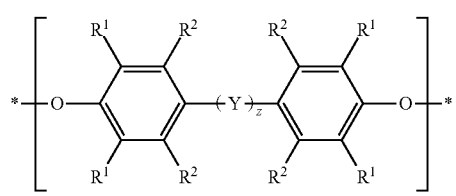

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

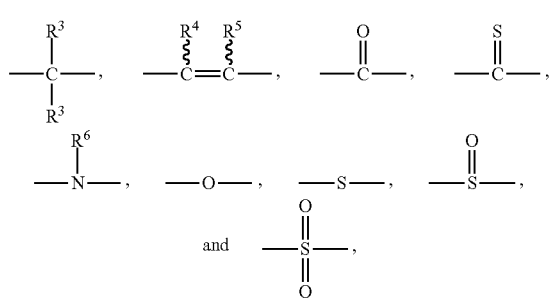

wherein each occurrence of $R^3$-$R^6$ is independently hydrogen or $C_1$-$C_{12}$ hydrocarbyl; at least two polysiloxane blocks having the structure

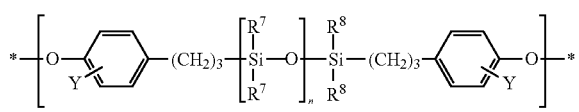

wherein each occurrence of $R^7$ is independently hydrogen, $C_1$-$C_{12}$ hydrocarbyl or $C_1$-$C_{12}$ halohydrocarbyl; Y is hydrogen, $C_1$-$C_{12}$ hydrocarbyl, $C_1$-$C_{12}$ hydrocarbyloxy, or halogen; each occurrence of $R^8$ is independently hydrogen, $C_1$-$C_{12}$ hydrocarbyl or $C_1$-$C_{12}$ halohydrocarbyl; and n is, on average, about 5 to about 100; and at least three block-linking groups, each block-linking group being the residue of an aromatic diacid chloride.

Another embodiment is a composition, comprising: the poly(arylene ether)-polysiloxane multiblock copolymer of the preceding paragraph; and an other polymer selected from the group consisting of poly(arylene ether)s, styrenic polymers, polyamides, polyolefins, poly(phenylene sulfide)s, and mixtures thereof.

Other embodiments include articles comprising the poly (arylene ether)-polysiloxane multiblock copolymer alone or in combination with the other polymer.

These and other embodiments are described in detail below.

DETAILED DESCRIPTION OF THE INVENTION

Figure 1:
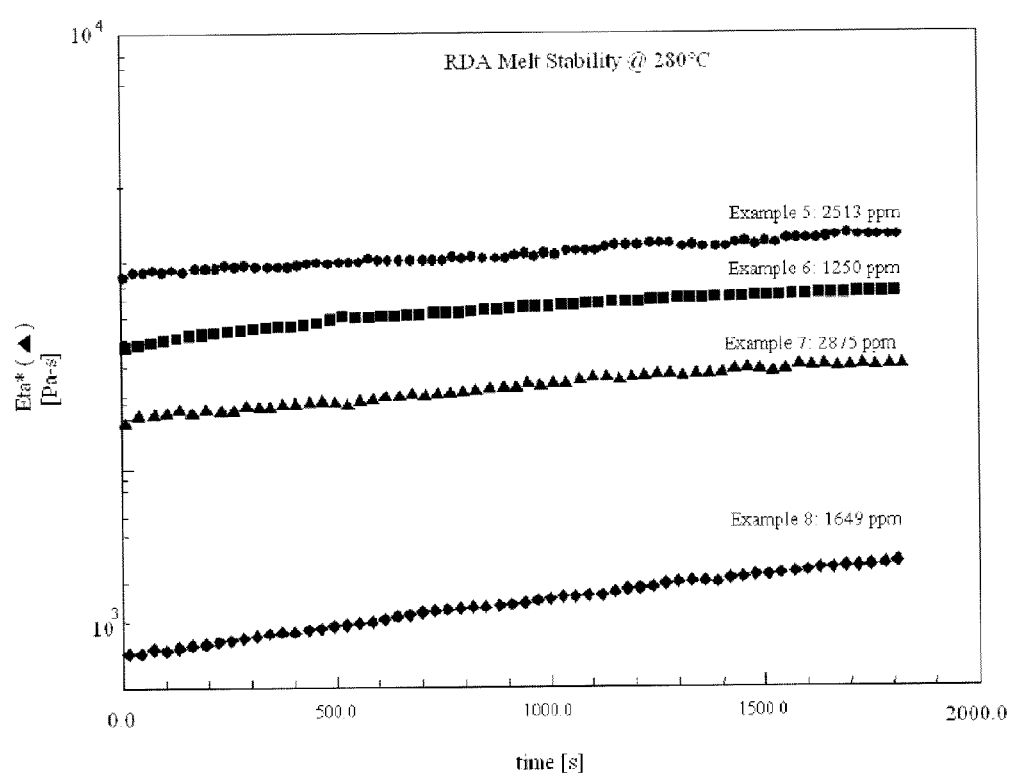
FIG. 1 relates to melt stability and is a plot of viscosity versus time for four multiblock copolymers with varying contents of hydroxy groups.

The present inventors have discovered that poly(arylene ether)-polysiloxane multiblock copolymers having superior properties compared to prior art poly(arylene ether)-polysiloxane block copolymers can be prepared by a method comprising reacting a hydroxy-diterminated poly(arylene ether), a hydroxyaryl-diterminated polysiloxane, and an aromatic diacid chloride. Specifically, the poly(arylene ether)-polysiloxane multiblock copolymers prepared by the present method can exhibit higher weight percent polysiloxane incorporation, higher molecular weight, and/or superior tensile properties compared to poly(arylene ether)-polysiloxane block copolymers prepared by condensation of amino-terminated polysiloxanes with maleic anhydride functionalized poly(arylene ether)s or by oxidative polymerization of a monohydric phenol in the presence of a hydroxyaryl-terminated polysiloxane.

The method requires a hydroxy-diterminated poly(arylene ether) as one of the reactants. As used herein, the term "hydroxy-diterminated poly(arylene ether)" refer to a poly (arylene ether) comprising two terminal hydroxyaryl groups. It is possible to use hydroxy-diterminated poly(arylene ether)s having intrinsic viscosities of 0.5 deciliters per gram and higher. However, it is presently preferred to use a hydroxy-diterminated poly(arylene ether) having an intrinsic viscosity of about 0.04 to about 0.2 deciliter per gram as measured at 25° C. in chloroform. Within the intrinsic viscosity range of about 0.04 to about 0.2 deciliter per gram, the intrinsic viscosity can be at least about 0.06 deciliter per gram. Also within the intrinsic viscosity range of about 0.04 to about 0.2 deciliter per gram, the intrinsic viscosity can be up to about 0.15 deciliter per gram, specifically up to about 0.12 deciliter per gram.

In some embodiments, the hydroxy-diterminated poly (arylene ether) has the structure

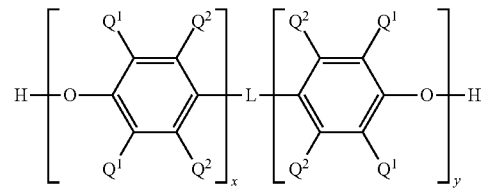

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

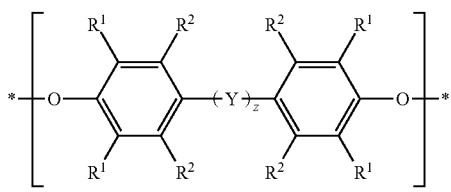

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

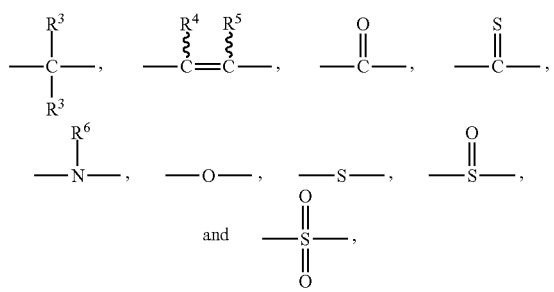

wherein each occurrence of $R^3$-$R^6$ is independently hydrogen or $C_1$-$C_{12}$ hydrocarbyl.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue may also comprise one or more substituents such as halogen (including fluorine, chlorine, bromine, and iodine), carboxylic acid groups, amino groups, hydroxyl groups, or the like, or it may contain divalent heteroatoms-containing groups such as oxygen atoms, silicon atoms, and carbonyl groups within the backbone of the hydrocarbyl residue. As one example, $Q^1$ may be a di-n-butylaminomethyl group formed by reaction of the methyl group of a 3,5-dimethyl-1,4-phenylene group with the di-n-butylamine component of an oxidative polymerization catalyst.

In the structure above, within the range of 0 to about 100, x and y can each independently be at least about 1, specifically at least about 3, more specifically at least about 5. Also within the range of 0 to about 100, x and y can each independently be up to about 60, specifically up to about 40, more specifically up to about 30, still more specifically up to about 20, yet more specifically up to about 15.

The hydroxy-diterminated poly(arylene ether) can be synthesized by oxidative copolymerization of monomers comprising a monohydric phenol and a dihydric phenol. In some embodiments, the monohydric phenol has the structure

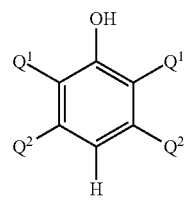

wherein each occurrence of $Q^1$ is independently selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl. In one embodiment, the monohydric phenol is selected from 2-methylphenol, 2,5-dimethylphenol, 2,6-dimethylphenol, 2,3,6-trimethylphenol, and combinations thereof. In one embodiment, the monohydric phenol comprises 2,6-dimethylphenol.

In some embodiments, the dihydric phenol has the structure

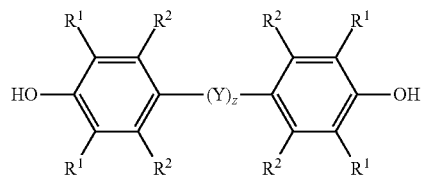

wherein each occurrence of $R^1$ and $R^2$ is independently hydrogen, halogen, primary or secondary $C_1$-$C_{12}$ alkyl, $C_1$-$C_{12}$ alkenyl, $C_1$-$C_{12}$ alkynyl, $C_1$-$C_{12}$ aminoalkyl, $C_1$-$C_{12}$ hydroxyalkyl, $C_6$-$C_{12}$ aryl (including phenyl), $C_1$-$C_{12}$ haloalkyl, $C_1$-$C_{12}$ hydrocarbonoxy, or $C_2$-$C_{12}$ halohydrocarbonoxy wherein at least two carbon atoms separate the halogen and oxygen atoms; z is 0 or 1; and Y is selected from

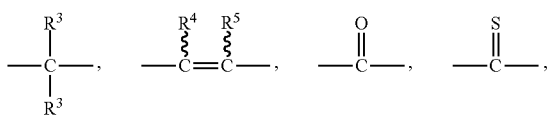

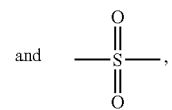

wherein each occurrence of $R^3$-$R^6$ is independently hydrogen or $C_1$-$C_{12}$ hydrocarbyl. In some embodiments, the dihydric phenol is selected from 1,1-bis(3,5-dimethyl-4-hydroxyphenyl)ethane, 1,1-bis(3-chloro-4-hydroxyphenyl)ethane, 1,1-bis(3-methyl-4-hydroxyphenyl)-ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenyl)ethane, 2,2'-binaphthol, 2,2'-biphenol, 2,2'-dihydroxy-4,4'-dimethoxybenzophenone, 2,2'-dihydroxy-4-methoxybenzophenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl) propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4-hydroxyphenyl)-1-phenylpropane, 2,2-bis(3-methyl-4-hydroxyphenyl)hexane, 2,2-bis(3-methyl-4-hydroxyphenyl)pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)-methane, bis(4-hydroxy-2,6-dimethyl-3-methoxyphenyl)methane, bis(3,5-dimethyl-4-hydroxyphenyl)methane, bis(3-methyl-4-hydroxyphenyl) methane, bis-(4-hydroxy-3,5-dimethyl phenyl)-cyclohexylmethane, bis(4-hydroxy-3,5-dimethyl phenyl) phenylmethane, bis(3-methyl-4-hydroxyphenyl) cyclohexylmethane, bis(3-methyl-4-hydroxyphenyl) methane, bis(3,5-dimethyl-4-hydroxyphenyl)methane, bis(3-methyl-4-hydroxyphenyl)phenylmethane, 2,2',3,3',5,5'-hexamethyl-4,4'-biphenol, octafluoro-4,4'-biphenol, 2,3,3',5,5'-pentamethyl-4,4'-biphenol, 1,1-bis(3,5-dibromo-4-hydroxyphenyl)cyclohexane 1,1-bis(3,5-dimethyl-4-hydroxyphenyl)cyclohexane, bis(3-methyl-4-hydroxyphenyl)cyclohexane, tetrabromobiphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, 3,3',5,5'-tetramethyl-4,4'-bisphenol sulfone, and combinations thereof. In some embodiments, the dihydric phenol comprises 2,2-bis(3,5-dimethyl-4-hydroxyphenyl) propane.

The monohydric phenol and the dihydric phenol can be used in any ratio consistent with achieving the desired intrinsic viscosity of the hydroxy-diterminated poly(arylene ether). In some embodiments, the monomers comprise the monohydric phenol and the dihydric phenol in a mole ratio of about 3 to about 110. Within this range, the ratio may be at least about 5, or at least about 7. Also within this range, the ratio may be up to about 50, or up to about 25.

As indicated by its name, the hydroxy-diterminated poly (arylene ether) has two hydroxy groups per molecule. As a practical matter, copolymerizaton of a monohydric phenol and a dihydric phenol may yield a product having slightly less than two hydroxy groups per molecule, on average. Thus, the hydroxy-diterminated poly(arylene ether) can be provided in the form of a material comprising, on average, about 1.8 to about 2 hydroxy groups per molecule.

In some embodiments, the hydroxy-diterminated poly (arylene ether) has the structure

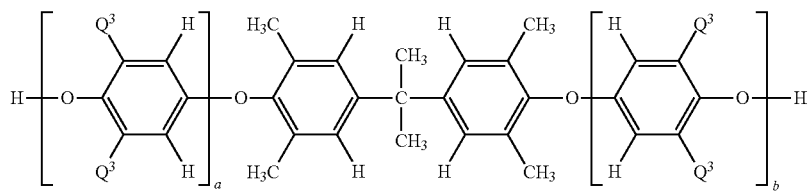

wherein each occurrence of $Q^3$ is independently methyl or di-n-butylaminomethyl; and each occurrence of a and b is independently 0 to about 100, provided that the sum of a and b is, on average, about 3 to about 100. Within the range of about 3 to about 100, the sum of a and b, on average, can be at least about 4, specifically at least about 5, more specifically at least about 6, still more specifically at least about 7. Also within the range of about 3 to about 100, the sum of a and b, on average, can be up to about 60, specifically up to about 40, more specifically up to about 30, still more specifically up to about 20, even more specifically up to about 15, yet more specifically up to about 10.

The method requires a hydroxyaryl-diterminated polysiloxane as one of the reactants. As used herein, the term "hydroxyaryl-diterminated polysiloxane" refers to a polysiloxane comprising two terminal hydroxyaryl groups. In some embodiments, the hydroxyaryl-diterminated polysiloxane comprises a plurality of repeating units having the structure

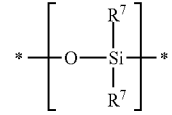

wherein each occurrence of $R^7$ is independently hydrogen, $C_1$-$C_{12}$ hydrocarbyl or $C_1$-$C_{12}$ halohydrocarbyl; and two terminal units having the structure

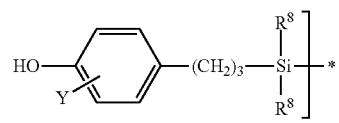

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl. In this context of the phrase "a plurality of repeating units", the word "plurality" means at least three In some embodiments, the hydroxyaryl-diterminated polysiloxane has the structure

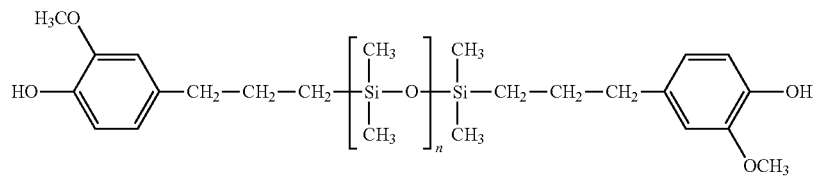

wherein n is, on average, about 5 to about 100. Within the range of about 5 to about 100, the value of n can be at least 7, more specifically at least 9. Also within the range of about 5 to about 100, the value of n can be up to about 60, specifically up to about 40, more specifically up to about 20, even more specifically up to about 15, yet more specifically up to about 12.

The hydroxyaryl-diterminated polysiloxane can be prepared by a hydrosilylation reaction between a vinyl-substituted phenol and a hydride-diterminated siloxane. For example, the so-called eugenol-terminated polysiloxane of the preceding paragraph can be prepared by a hydrosilylation reaction between eugenol (CAS Reg. No. 97-53-0) and a hydride-diterminated polydimethylsiloxane. Various hydroxyaryl-diterminated polysiloxane are also commercially available from Momentive Performance Materials, including those sold under grade numbers Y-17126 and CF-2003.

One advantage of the present method is its suitability for use over a wide range of ratios of hydroxy-diterminated poly(arylene ether) and the hydroxyaryl-diterminated polysiloxane. In contrast, the oxidative polymerization method produces products with low molecular weight and inefficient polysiloxane incorporation when used at low ratios of hydroxy-diterminated poly(arylene ether) to hydroxyaryl-diterminated polysiloxane. In some embodiments, the hydroxy-diterminated poly(arylene ether) and the hydroxyaryl-diterminated polysiloxane are reacted in a weight ratio of about 0.1:1 to about 10:1. Within this range, the ratio can be at least about 0.2:1, specifically about 0.3:1. Also within this range, the ratio can be up to about 5:1, specifically up to about 2:1, more specifically up to about 1:1.

In addition to the hydroxy-diterminated poly(arylene ether) and the hydroxyaryl-diterminated polysiloxane, the method requires an aromatic diacid chloride as one of the reactants. As used herein, the term "aromatic diacid chloride" refers to an aromatic molecule in which two acid chloride groups are each bound directly to an aromatic carbon atom. In some embodiments, the aromatic diacid chloride has a total of about 8 to about 20 carbon atoms. Suitable aromatic diacid chlorides include, for example, terephthaloyl chloride (CAS Reg. No. 100-20-9), isophthaloyl chloride (CAS Reg. No. 99-63-8), 4,4'-biphenyldicarbonyl chloride (CAS Reg. No. 2351-37-3), 3,3'-biphenyldicarbonyl chloride, 3,4'-biphenyldicarbonyl chloride, 4,4'-oxybis(benzoyl chloride) (CAS Reg. No. 7158-32-9), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof. In some embodiments, the aromatic diacid chloride comprises terephthaloyl chloride.

The aromatic diacid chloride is used in an amount sufficient to form the multiblock copolymer by linking, on average, at least two hydroxy-diterminated poly(arylene ether) residues and at least two hydroxyaryl-diterminated polysiloxane residues per molecule. In some embodiments, the aromatic diacid chloride is used in an amount sufficient to provide a molar ratio of acid chloride groups to hydroxy groups of about 0.9:1 to 1.05:1. In this ratio, the acid chloride groups are present on the aromatic diacid chloride, and the hydroxy groups are present on the hydroxy-diterminated poly(arylene ether) and the hydroxyaryl-diterminated polysiloxane. Within the range of about 0.9:1 to about 1.05:1, the molar ratio of acid chloride groups to hydroxy groups can be at least about 0.93:1, specifically at least about 0.95:1. Also within the range of about 0.9:1 to about 1.05:1, the molar ratio of acid chloride groups to hydroxy groups can be up to about 1.03:1, specifically up to about 0.99:1. As shown in the working examples below, use of a ratio substantially greater than 1:1 can lead to formation of gels.

The reaction of the hydroxy-diterminated poly(arylene ether), the hydroxyaryl-diterminated polysiloxane, and the aromatic diacid chloride is facilitated by the presence of a tertiary amine. Suitable tertiary amines include, for example, trialkylamines (including trimethylamine and triethylamine) and pyridines (including dialkylaminopyridines and pyrrolidinopyridines). In some embodiments, the tertiary amine comprises triethylamine. When present, the tertiary amine can be used in an amount of about 0.1 to about 2 moles per mole of acid chloride groups, specifically about 0.2 to about 1 mole per mole of acid chloride groups, more specifically about 0.3 to about 0.8 mole per mole of acid chloride groups.

The reaction of the hydroxy-diterminated poly(arylene ether), the hydroxyaryl-diterminated polysiloxane, and the aromatic diacid chloride can be conducted in the presence of a solvent. Suitable solvents include halogenated alkanes (e.g., dichloromethane, chloroform), halogenated alkenes (e.g., 1,2-dichloroethylene), aromatic solvents (e.g., benzene, toluene, xylenes), and halogenated aromatic solvents (e.g., chlorobenzene, ortho-dichlorobenzene). In some embodiments, the solvent comprises dichloromethane. The amount of solvent used is typically about 50 to about 98 weight percent, based on the total weight of the hydroxy-diterminated poly(arylene ether), the hydroxyaryl-diterminated polysiloxane, the aromatic diacid chloride, the tertiary amine (if any), and the solvent.

Various modes of combining the reactants are possible. In so-called "unstarved" embodiments of the method, the hydroxyaryl-diterminated polysiloxane and the hydroxy-diterminated poly(arylene ether) are both present during the reaction with the aromatic diacid chloride. For example, the aromatic diacid chloride can be added to the combined hydroxyaryl-diterminated polysiloxane and hydroxy-diterminated poly(arylene ether). Alternatively, the hydroxyaryl-diterminated polysiloxane and the hydroxy-diterminated poly(arylene ether) can be added simultaneously (separately or as a combined solution) to the aromatic diacid chloride. In the "unstarved" embodiments, no measures are taken to compensate for the sometimes greater reactivity of the hydroxyaryl-diterminated polysiloxane relative to the hydroxy-diterminated poly(arylene ether).

In the so-called "starved" embodiments of the method, measures are taken to compensate for the sometimes greater reactivity of the hydroxyaryl-diterminated polysiloxane relative to the hydroxy-diterminated poly(arylene ether). The aromatic diacid chloride and the hydroxyaryl-diterminated polysiloxane can be added to the hydroxy-diterminated poly (arylene ether) simultaneously, sequentially, or a combination of simultaneously and sequentially, as long as at least some of the aromatic diacid chloride is added before addition of the hydroxyaryl-diterminated polysiloxane is complete. An example of sequential addition would be rapid addition to the hydroxy-diterminated poly(arylene ether) of the entirety of the aromatic diacid chloride, followed by gradual addition of the hydroxyaryl-diterminated polysiloxane over the course of 60 minutes. An example of simultaneous addition of the aromatic diacid chloride and the hydroxyaryl-diterminated polysiloxane would be gradual co-addition to the hydroxy-diterminated poly(arylene ether) of the entirety of the aromatic diacid chloride and the entirety of the hydroxaryl-diterminated polysiloxane over the course of 60 minutes. An example of a combination of sequential and simultaneous addition would be gradual addition of the aromatic diacid chloride over the course of 60 minutes, with gradual addition of hydroxaryl-diterminated polysiloxane beginning 30 minutes after the beginning of aromatic diacid chloride addition and ending 30 minutes after the ending of aromatic diacid chloride addition. Another example of a combination of sequential and simultaneous addition would be addition of a small portion (e.g., 10% or less) of the hydroxaryl-diterminated polysiloxane to the hydroxy-diterminated poly(arylene ether), followed by gradual co-addition of the remainder of the hydroxaryl-diterminated polysiloxane and the entirety of the aromatic diacid chloride.

In a particular "starved" embodiment, the reacting comprises adding the aromatic diacid chloride and the hydroxyaryl-diterminated polysiloxane to the hydroxy-diterminated poly(arylene ether).

In another particular "starved" embodiment, the reacting comprises adding at least a portion of the aromatic diacid chloride to the hydroxy-diterminated poly(arylene ether), followed by adding at least a portion of the hydroxyaryl-diterminated polysiloxane to the hydroxy-diterminated poly (arylene ether) and the at least a portion of the aromatic diacid chloride.

The method can, optionally, further comprise capping of the terminal hydroxy groups of the multiblock copolymer. By capping is meant the replacement of a terminal hydroxy group with an ether group, an ester group, a urethane group, or the like. For example, an ester capped multiblock copolymer can be formed by reacting the multiblock copolymer with at least one mole of benzoyl chloride per mole of hydroxy groups. As demonstrated in the working example below, capped multiblock copolymers can exhibit improved melt stability relative to uncapped multiblock copolymers.

The method is suitable for preparing multiblock copolymers having a wide range of molecular weights. For example, in some embodiments, the poly(arylene ether)-polysiloxane multiblock copolymer has a number average molecular weight of about 5,000 to about 50,000 atomic mass units. Within the range of about 5,000 to about 50,000, the number average molecular weight can be at least about 10,000 atomic mass unit, specifically at least about 15,000 atomic mass units, more specifically at least about 20,000 atomic mass units. Also within the range of about 5,000 to about 50,000, the number average molecular weight can be up to about 45,000 atomic mass units, specifically up to about 40,000 atomic mass units.

While it is possible to use the method to prepare diblock and triblock copolymers, it is more typical to produce a poly (arylene ether)-polysiloxane multiblock copolymer comprising at least two poly(arylene ether) blocks and at least two polysiloxane blocks. It is possible to have many more than four total blocks in the multiblock copolymer. For example, in some embodiments, the poly(arylene ether)-polysiloxane multiblock copolymer comprises about 5 to about 25 poly (arylene ether) blocks and about 10 to about 30 polysiloxane blocks. Within the range of about 5 to about 25 blocks per molecule, the number of poly(arylene ether) blocks can be about 7 to about 20 blocks, specifically about 9 to about 15 blocks. Within the range of about 10 to about 30 polysiloxane blocks per molecule, the number of polysiloxane blocks can be about 15 to about 25, specifically about 18 to about 25. In these embodiments, it will be understood that the poly (arylene ether) blocks are the residue of the hydroxy-diterminated poly(arylene ether), and the polysiloxane blocks are the residue of the hydroxyaryl-diterminated polysiloxane.

In a very specific embodiment of the process, the hydroxy-diterminated poly(arylene ether) has the structure

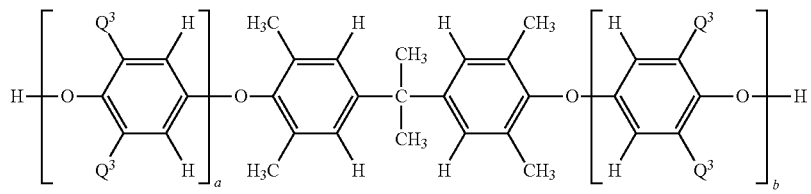

wherein each occurrence of $Q^3$ is independently methyl or di-n-butylaminomethyl; and each occurrence of a and b is independently 0 to about 100, provided that the sum of a and b is, on average, about 3 to about 100; the hydroxyaryl-diterminated polysiloxane has the structure

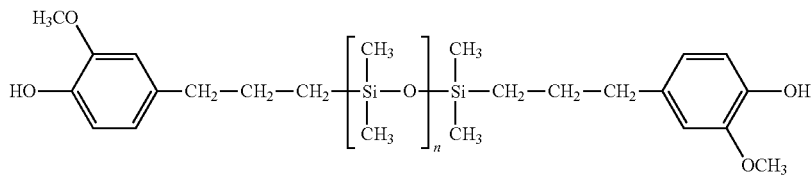

wherein n is, on average, about 5 to about 15; the aromatic diacid chloride comprises terephthaloyl chloride; and the reacting is conducted in the presence of a tertiary amine.

The invention extends to poly(arylene ether)-polysiloxane multiblock copolymers prepared by any of the methods described above. The poly(arylene ether)-polysiloxane multiblock copolymer can be described not only in product-by-process terms but also according to its constituent chemical moieties. Thus, one embodiment is a poly(arylene ether)-polysiloxane multiblock copolymer, comprising: at least two poly(arylene ether) blocks having the structure

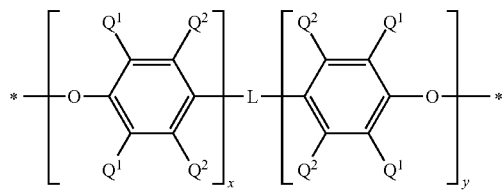

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_3$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

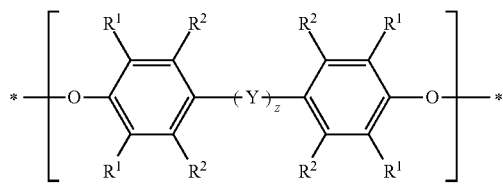

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

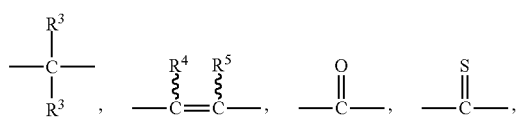

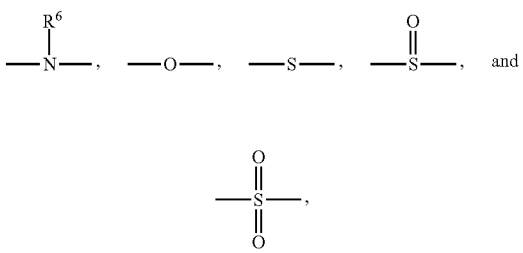

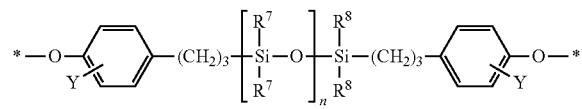

wherein each occurrence of $R^3$-$R^6$ is independently hydrogen or $C_1$-$C_{12}$ hydrocarbyl; at least two polysiloxane blocks having the structure

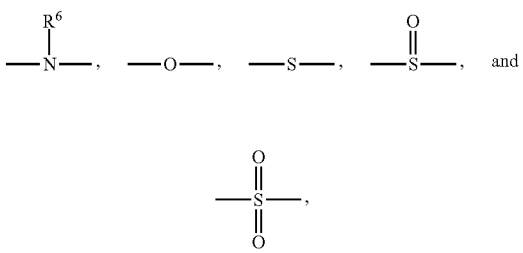

wherein each occurrence of $R^7$ is independently hydrogen, $C_1$-$C_{12}$ hydrocarbyl or $C_1$-$C_{12}$ halohydrocarbyl; Y is hydrogen, $C_1$-$C_{12}$ hydrocarbyl, hydrocarbyloxy, or halogen; each occurrence of $R^8$ is independently hydrogen, $C_1$-$C_{12}$ hydrocarbyl or $C_1$-$C_{12}$ halohydrocarbyl; and n is, on average, about 5 to about 100; and at least three block-linking groups, each block-linking group being the residue of an aromatic diacid chloride. In the structure above, within the range of 0 to about 100, x and y can each independently be at least about 1, specifically at least about 3, more specifically at least about 5. Also within the range of 0 to about 100, x and y can each independently be up to about 60, specifically up to about 40, more specifically up to about 30, still more specifically up to about 20, yet more specifically up to about 15. Within the range of about 5 to about 100, the value of n can be at least 7, more specifically at least 9. Also within the range of about 5 to about 100, the value of n can be up to about 60, specifically up to about 40, more specifically up to about 20, even more specifically up to about 15, yet more specifically up to about 12.

In some embodiments, the at least two poly(arylene ether) blocks each independently have the structure

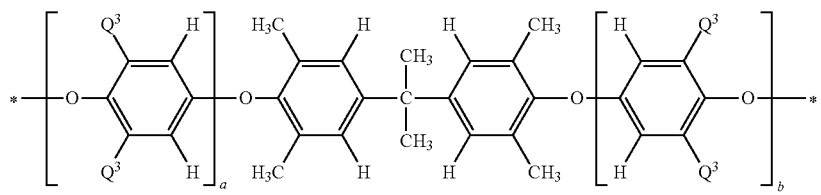

wherein each occurrence of $Q^3$ is independently methyl or di-n-butylaminomethyl; and each occurrence of a and b is independently 0 to about 100, provided that the sum of a and b is, on average, about 3 to about 100. Within the range of about 3 to about 100, the sum of a and b, on average, can be at least about 4, specifically at least about 5, more specifically at least about 6, still more specifically at least about 7. Also within the range of about 3 to about 100, the sum of a and b, on average, can be up to about 60, specifically up to about 40, more specifically up to about 30, still more specifically up to about 20, even more specifically up to about 15, yet more specifically up to about 10.

In some embodiments, the at least two polysiloxane blocks each independently have the structure

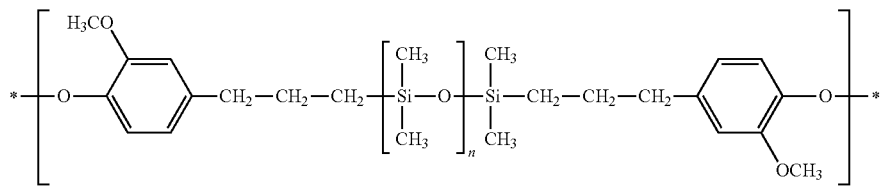

wherein n is, on average, about 5 to about 15.

In some embodiments, each of the at least three block-linking groups is, independently, the residue of an aromatic diacid chloride selected from the group consisting of terephthaloyl chloride (CAS Reg. No. 100-20-9), isophthaloyl chloride (CAS Reg. No. 99-63-8), 4,4'-biphenyldicarbonyl chloride (CAS Reg. No. 2351-37-3), 3,3'-biphenyldicarbonyl chloride, 3,4'-biphenyldicarbonyl chloride, 4,4'-oxybis(benzoyl chloride) (CAS Reg. No. 7158-32-9), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof. In some embodiments, each of the at least three block linking groups is the residue of terephthaloyl chloride. When the aromatic diacid chloride comprises terephthaloyl chloride, the block-linking groups have the structure

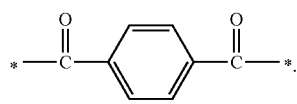

In some embodiments, the poly(arylene ether)-polysiloxane multiblock copolymer has a number average molecular weight of about 5,000 to about 50,000 atomic mass units. Within the range of about 5,000 to about 50,000, the number average molecular weight can be at least about 10,000 atomic mass unit, specifically at least about 15,000 atomic mass units, more specifically at least about 20,000 atomic mass units. Also within the range of about 5,000 to about 50,000, the number average molecular weight can be up to about 45,000 atomic mass units, specifically up to about 40,000 atomic mass units.

The poly(arylene ether)-polysiloxane multiblock copolymer can comprise many more blocks than the diblock and triblock copolymer produced by some other methods. Thus, in some embodiments, the poly(arylene ether)-polysiloxane multiblock copolymer, comprises about 5 to about 25 poly (arylene ether) blocks and about 10 to about 30 polysiloxane blocks. Within the range of about 5 to about 25 blocks per molecule, the number of poly(arylene ether) blocks can be about 7 to about 20 blocks, specifically about 9 to about 15 blocks. Within the range of about 10 to about 30 polysiloxane blocks per molecule, the number of polysiloxane blocks can be about 15 to about 25, specifically about 18 to about 25. In these embodiments, it will be understood that the poly (arylene ether) blocks are the residue of the hydroxy-diterminated poly(arylene ether), and the polysiloxane blocks are the residue of the hydroxyaryl-diterminated polysiloxane.

One of the advantages of the present method is that it produces multiblock copolymers with a relatively large number of linkages between poly(arylene ether) blocks and polysiloxane blocks. Thus, in some embodiments, at least 10 (mole) percent of the block-linking groups link a poly (arylene ether) block and a polysiloxane block. The (mole) percent of block-linking groups linking a poly(arylene ether) block and a polysiloxane block can be 10 to about 40, specifically 15 to about 35, more specifically 15 to about 30. The remaining block-linking groups link two poly(arylene ether) blocks or link two polysiloxane blocks. By including a relatively large number of block-linking groups linking a poly (arylene ether) block and a polysiloxane block, the multiblock copolymer has relatively short polysiloxane segments and exhibits a morphology comprising relatively small polysiloxane domains. For example, the polysiloxane domains can have dimensions of about 10 to about 50 nanometers, specifically about 20 to about 40 nanometers. This fine-grained morphology, in turn, improves physical properties.

In a very specific embodiment of the poly(arylene ether)-polysiloxane multiblock copolymer, the at least two poly(arylene ether) blocks have the structure

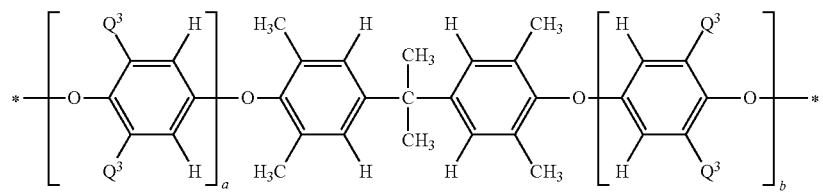

wherein each occurrence of $Q^3$ is independently methyl or di-n-butylaminomethyl; and each occurrence of a and b is independently 0 to about 15, provided that the sum of a and b is, on average, about 4 to about 15; the at least two polysiloxane blocks have the structure

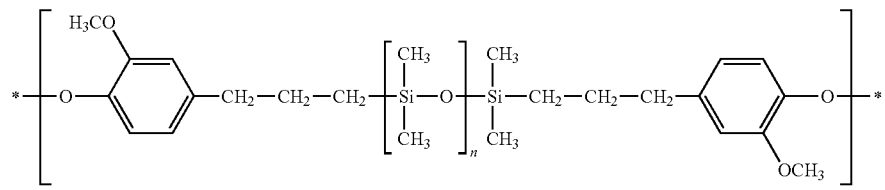

wherein n is, on average, about 5 to about 15; and the at least three block-linking groups have the structure

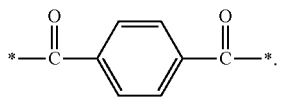

The invention includes compositions comprising the poly(arylene ether)-polysiloxane multiblock copolymer and at least one other chemical compound and/or material. One embodiment is a composition comprising one or more of the poly(arylene ether)-polysiloxane multiblock copolymers described above and an other polymer. The other polymer can be, for example, a poly(arylene ether), a styrenic polymer, a polyamide, a polyolefin, a poly(phenylene sulfide), or a mixture thereof (i.e., a mixture of at least two of the foregoing other polymers). Blending one or more of these other polymers with a poly(arylene ether)-polysiloxane multiblock copolymer is beneficial because the blend can exhibit improved physical properties and/or improved flame retardancy and/or improved smoke suppression relative to the other polymer alone. The weight ratio of the poly(arylene ether)-polysiloxane multiblock copolymer to the other polymer can be about 1:99 to about 99:1, specifically about 2:98 to about 50:50, more specifically about 5:95 to about 20:80. The poly(arylene ether)-polysiloxane multiblock copolymer and the other polymer can be blended by conventional methods, including melt blending (e.g., in an extruder) and solution blending.

The other polymer can be a poly(arylene ether). Poly(arylene ether)s are known polymers that are typically synthesized by the oxidative copolymerization of a monohydric phenol, optionally in combination with a dihydric or polyhydric phenol. Suitable monohydric phenols and dihydric phenols include those described above in the context of the preparation of the hydroxy-diterminated poly(arylene ether). The poly(arylene ether) can have an intrinsic viscosity of about 0.05 to about 1 deciliter per gram, as measured at 25° C. in chloroform. In some embodiments, the poly(arylene ether) is a homopolymer of 2,6-dimethylphenol, a copolymer of 2,6-dimethylphenol and 2,3,6-trimethylphenol, or a mixture thereof.

The other polymer can be a styrenic polymer. In general, the styrenic polymer is a polymer comprising at least 10 weight percent of units derived from polymerization of styrene or another alkenyl aromatic monomer represented by the structure

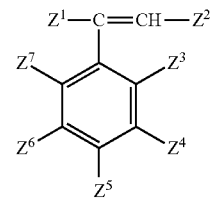

wherein $Z^1$ and $Z^2$ each independently represent a hydrogen atom, a $C_1$-$C_8$ alkyl group, or a $C_2$-$C_8$ alkenyl group; $Z^3$ and $Z^7$ each independently represent a hydrogen atom, or a $C_1$-$C_8$ alkyl group; and $Z^4$, $Z^5$, and $Z^6$ each independently represent a hydrogen atom, a $C_1$-$C_8$ alkyl group, or a $C_2$-$C_8$ alkenyl group, or $Z^3$ and $Z^4$ are taken together with the central aromatic ring to form a naphthyl group, or $Z^4$ and $Z^5$ are taken together with the central aromatic ring to form a naphthyl group. Specific alkenyl aromatic monomers include, for example, styrene, methylstyrenes such as alpha-methylstyrene and p-methylstyrene, and p-t-butylstyrene.

Particular classes of styrenic polymers include, for example, homopolystyrenes, rubber-modified polystyrenes, unhydrogenated block copolymers of an alkenyl aromatic monomer and a conjugated diene, hydrogenated block copolymers of an alkenyl aromatic monomer and a conjugated diene, and the like, and mixtures thereof.

In some embodiments, the styrenic polymer comprises a homopolystyrene, specifically a polystyrene having a weight average molecular weight of about 20,000 to about 300,000 atomic mass units. The polystyrene can be an atactic polystyrene or a syndiotactic polystyrene.

In some embodiments, the styrenic polymer comprises a rubber-modified polystyrene (also sometimes referred to as a high-impact polystyrene or HIPS). Suitable rubber modified polystyrenes include those having a total weight average molecular weight of about 20,000 to about 300,000 atomic mass units; about 80 to about 95 weight percent polystyrene and about 5 to about 20 weight percent polybutadiene; and a polybutadiene particle size of about 0.1 to about 30 micrometers.

In some embodiments, the styrenic polymer comprises an unhydrogenated block copolymer of an alkenyl aromatic monomer and a conjugated diene, a (partially or fully) hydrogenated block copolymer of an alkenyl aromatic monomer and a conjugated diene, or a mixture thereof. Illustrative unhydrogenated block copolymers are polystyrene-polybutadiene diblock copolymers (SB), polystyrene-polybutadiene-polystyrene triblock copolymers (SBS), and polystyrene-polyisoprene-polystyrene triblock copolymers (SIS). Illustrative hydrogenated block copolymers are polystyrene-poly(ethylene-propylene) diblock copolymer (SEP), polystyrene-poly(ethylene-butylene)-polystyrene (SEBS), and polystyrene-poly(butadiene-butylene)-polystyrene triblock copolymer (also known as SBBS, or partially hydrogenated polystyrene-polybutadiene-polystyrene triblock copolymer). The block polymer can comprise at least one block having a random or controlled distribution of styrene and butadiene. Such styrenic polymers include those sold under the trade names KRATON A-RP6936 and KRATON A-RP6935 by Kraton Polymers, and L601 by Asahi Kasei. In some embodiments, the styrenic polymer comprises a polystyrene-poly(ethylene-butylene)-polystyrene triblock copolymer. In some embodiments, the styrenic polymer comprises a polystyrene-poly(ethylene-butylene)-polystyrene triblock copolymer comprising about 10 to about 70 weight percent polystyrene, based on the weight of the triblock copolymer. In some embodiments, the styrenic polymer comprises a radial block copolymer of an alkenyl aromatic monomer and a conjugated diene; wherein the radial block copolymer has 50 to about 75 weight percent of repeating units derived from the alkenyl aromatic monomer; and wherein the radial block copolymer has a number average molecular weight less than or equal to 70,000 atomic mass units.

Combinations of two or more different styrenic polymers can be used. Thus, in some embodiments, the styrenic polymer comprises a homopolystyrene and a rubber-modified polystyrene. In some embodiments, the styrenic polymer comprises a homopolystyrene in combination with an unhydrogenated block copolymer of an alkenyl aromatic monomer and a conjugated diene, a hydrogenated block copolymer of an alkenyl aromatic monomer, or a mixture thereof.

Methods of producing styrenic polymers are known in the art, and a wide variety of styrenic polymers is commercially available.

The other polymer can be a polyamide. The polyamide resins are a generic family of resins, also known as nylons, characterized by the presence of recurring amide (—C(O)NH—) units in the main polymer chain. In some embodiments, the polyamide is a polyamide-6 and/or a polyamide-6,6. Other polyamides, such as polyamide-4, polyamide-4,6, polyamide-12, polyamide-6,10, polyamide-6,9, polyamide-6,12, polyamide-ST, copolymers of polyamide-6,6 and polyamide-6, and others such as the amorphous polyamides, are also useful. Mixtures of various polyamides, as well as various polyamide copolymers, are also useful. Methods of preparing polyamides are known in the art.

The polyamides can be obtained by a number of known processes such as those described in U.S. Pat. Nos. 2,071,250 and 2,071,251 and 2,130,523 and 2, 130,948 to Carrothers, 2,241,322 and 2,312,966 to Hanford, and 2,512,606 to Bolton et al. Polyamide-6, for example, is a polymerization product of caprolactam. Polyamide-6,6 is a condensation product of adipic acid and 1,6-diaminohexane. Likewise, polyamide-4,6 is a condensation product between adipic acid and 1,4-diaminobutane. Besides adipic acid, other useful diacids for the preparation of polyamides include azelaic acid, sebacic acid, dodecane diacid, as well as terephthalic and isophthalic acids, and the like. Other useful diamines include m-xylene diamine, di-(4-aminophenyl)methane, di-(4-aminocyclohexyl)methane; 2,2-di-(4-aminophenyl)propane, 2,2-di-(4-aminocyclohexyl)propane, among others. Copolymers of caprolactam with diacids and diamines are also useful.

It is also to be understood that the use of the term "polyamides" herein is intended to include the toughened or super tough polyamides. Super tough polyamides, or super tough nylons as commonly known, are commercially available as, for example, available from E.I. duPont under the trade name ZYTEL ST, and methods for their preparation are known.

The other polymer can be a polyester. Suitable polyesters include those comprising structural units of the formula

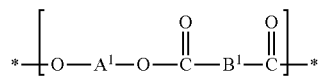

wherein each $A^1$ is independently a divalent aliphatic, alicyclic or aromatic hydrocarbon radical, or mixtures thereof and each $B^1$ is independently a divalent aliphatic, alicyclic or aromatic radical, or mixtures thereof. Examples of suitable polyesters are poly(alkylene dicarboxylate)s, liquid crystalline polyesters, polyarylates, and polyester copolymers such as copolyestercarbonates and polyesteramides. Also included are polyesters that have been treated with relatively low levels of diepoxy or multi-epoxy compounds. It is also possible to use branched polyesters in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make branched polyester. Furthermore, it is sometimes desirable to have various concentrations of acid and hydroxyl endgroups on the polyester, depending on the ultimate end-use of the composition.

In one embodiment at least some of the polyester comprises nucleophilic groups such as, for example, carboxylic acid groups. In some instances, it is desirable to reduce the number of carboxylic end groups, typically to less than 20 micro equivalents per gram of polyester, with the use of acid reactive species. In other instances, it is desirable that the polyester has a relatively high carboxylic end group concentration, in the range of 20 to 250 micro equivalents per gram of polyester or, more specifically, 30 to 100 micro equivalents per gram of polyester.

In one embodiment, the $A^1$ radical is a $C_2$-$C_{10}$ alkylene radical, a $C_6$-$C_{10}$ alicyclic radical or a $C_6$-$C_{20}$ aromatic radical in which the alkylene groups contain 2-6 and most often 2 or 4 carbon atoms. The $B^1$ radical is most often p-phenylene or m-phenylene or a mixture thereof. This class of polyesters includes the poly(alkylene terephthalates), the poly(alkylene naphthalates) and the polyarylates. Exemplary poly(alkylene terephthalates) include linear aliphatic polyesters such as poly(ethylene terephthalate) (PET) and polybutylene terephthalate) (PBT), as well as cyclic aliphatic polyesters such as poly(cyclohexanedimethanol terephthalate) (PCT). Exemplary poly(alkylene naphthalate)s include poly(butylene-2,6-naphthalate) (PBN) and poly(ethylene-2,6-naphthalate) (PEN). Other useful polyesters include poly(ethylene-co-cyclohexanedimethanol terephthalate) (PETG), polytrimethylene terephthalate (PTT), poly(dimethanol-1,4-cyclohexanedicarboxylate) (PCCD), and polyxylene terephthalate (PXT). Polyesters and methods for their preparation are known in the art as illustrated U.S. Pat. No. 2,465,319 to Whinfield et al., U.S. Pat. No. 2,720,502 to Caldwell, U.S. Pat. No. 2,727,881 to Caldwell et al., U.S. Pat. No. 2,822,348 to Haslam, U.S. Pat. No. 3,047,539 to Pengilly, U.S. Pat. No. 3,671,487 to Abolins, U.S. Pat. No. 3,953,394 to Fox et al., and U.S. Pat. No. 4,128,526 to Borman.

Liquid crystalline polyesters having melting points less that 380° C. and comprising recurring units derived from aromatic diols, aliphatic or aromatic dicarboxylic acids, and aromatic hydroxy carboxylic acids are also useful. Examples of useful liquid crystalline polyesters include, but are not limited to, those described in U.S. Pat. Nos. 4,664,972 to Connolly and 5,110,896 to Waggoner et al. Mixtures of polyesters are also sometimes suitable.

The various polyesters can be distinguished by their corresponding glass transition temperatures ($T_g$) and melting points ($T_m$). The liquid crystalline polyesters generally have a $T_g$ and $T_m$ that are higher than the naphthalate-type polyesters. The naphthalate-type polyesters generally have a $T_g$ and $T_m$ that are higher than the terephthalate-type polyesters. Thus, the resultant poly(arylene ether) alloys with the liquid crystalline or naphthalate-type polyesters are typically better suited to applications requiring higher temperature resistance than are the terephthalate-type polyesters. The poly(arylene ether) alloys with terephthalate-type polyesters are generally easier to process due to the polyesters' lower $T_g$ values and $T_m$ values. Selection of the polyester or blend of polyesters utilized is therefore determined, in part, by the desired property profile required by the ultimate end-use application for the composition.

Because of the tendency of polyesters to undergo hydrolytic degradation at the high extrusion and molding temperatures in some embodiments the polyester is substantially free of water. The polyester may be prettied before admixing with the other ingredients. Alternatively, the polyester can be used without prettying and the volatile materials can be removed by vacuum venting the extruder. The polyesters generally have number average molecular weights in the range of 15,000-100,000, as determined by gel permeation chromatography (GPC) at 30° C. in a 60:40 by weight mixture of phenol and 1,1,2,2-tetrachloroethane.

The other polymer can be a polyolefin. Polyolefins include olefin homopolymers, such as polyethylene, polypropylene and polyisobutylene, as well as olefin copolymers. Exemplary homopolymers include polyethylene, high density polyethylene (HDPE), medium density polyethylene (MDPE), and isotactic polypropylene. Polyolefin resins of this general structure and methods for their preparation are well known in the art. Polyolefins typically have a density of about 0.91 to about 0.98 grams per centimeter$^3$.

The polyolefin may also be an olefin copolymer. Such copolymers include copolymers of ethylene and alpha olefins like octene, propylene and 4-methylpentene-1 as well as copolymers of ethylene and one or more rubbers and copolymers of propylene and one or more rubbers. Copolymers of ethylene and $C_3$-$C_{10}$ monoolefins and non-conjugated dienes, herein referred to as EPDM copolymers, are also suitable. Examples of suitable $C_3$-$C_{10}$ monoolefins for EPDM copolymers include propylene, 1-butene, 2-butene, 1-pentene, 2-pentene, 1-hexene, 2-hexene, 3-hexene, and the like. Suitable dienes include 1,4-hexadiene and monocylic and polycyclic dienes. Mole ratios of ethylene to other $C_3$-$C_{10}$ monoolefin monomers can be about 95:5 to about 5:95 with diene units being present in an amount of about 0.1 to about 10 mole percent. EPDM copolymers can be functionalized with an acyl group or electrophilic group for grafting onto a polyphenylene ether as disclosed in U.S. Pat. No. 5,258,455 to Laughner et al. Olefin copolymers further linear low density polyethylene (LLDPE).

The thermoplastic composition may comprise a single polyolefin homopolymer, a combination of polyolefin homopolymers, a single polyolefin copolymer, a combination of polyolefin copolymers, or a combination comprising a polyolefin homopolymer and a polyolefin copolymer.

In some embodiments the polyolefin is selected from the group consisting of polypropylene, high density polyethylene, and combinations of polypropylene and high density polyethylene. The polypropylene can be homopolypropylene or a polypropylene copolymer. Copolymers of polypropylene and rubber or block copolymers are sometimes referred to as impact modified polypropylene. Such copolymers are typically heterophasic and have sufficiently long sections of each component to have both amorphous and crystalline phases. Additionally the polypropylene may comprise a combination of homopolymer and copolymer, a combination of homopolymers having different melting temperatures, or a combination of homopolymers having different melt flow rates.

In some embodiments the polypropylene comprises a crystalline polypropylene such as isotactic polypropylene. Crystalline polypropylenes are defined as polypropylenes having a crystallinity content greater than or equal to 20%, more specifically greater than or equal to 25%, even more specifically greater than or equal to 30%. Crystallinity content may be determined by differential scanning calorimetry (DSC).

The high density polyethylene can be polyethylene homopolymer or a polyethylene copolymer. Additionally the high density polyethylene may comprise a combination of homopolymer and copolymer, a combination of homopolymers having different melting temperatures, or a combination of homopolymers having different melt flow rates and generally having a density of 0.941 to 0.965 g/cm$^3$.

The other polymer can be a poly(arylene sulfide). Poly(arylene sulfide)s are a known class of polymers containing arylene groups separated by sulfur atoms. They include poly(phenylene sulfide)s, for example poly(p-phenylene sulfide), and substituted poly(phenylene sulfide)s. Typical poly(arylene ether)s comprise at least 70 mole percent, specifically at least 90 mole percent, more specifically at least 95 mole percent, of recurring para-phenylene sulfide units having the structure

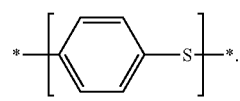

When the amount of said recurring units is less than 70 molar %, the heat resistance is somewhat limited. The remaining up to 30 mole percent of recurring units in the poly(arylene sulfide) can, in some embodiments, have a structure selected from

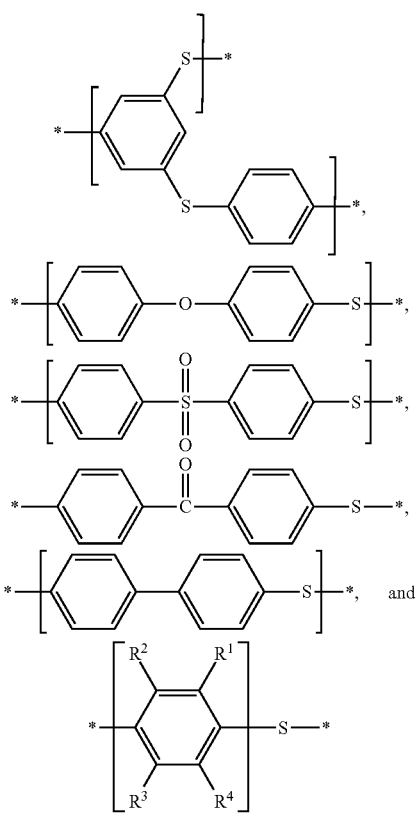

wherein $R^1$, $R^2$, $R^3$ and $R^4$ are, independently at each occurrence, hydrogen, halogen, $C_1$-$C_{12}$ hydrocarbyl, $C_1$-$C_{12}$ hydrocarbyloxy, nitro, amino, carboxy, or the like.

The poly(arylene sulfide) can be functionalized or unfunctionalized. If the poly(arylene sulfide) is functionalized, the functional groups can include amino, carboxylic acid, metal carboxylate, disulfide, thiol, and metal thiolate groups. One method for incorporation of functional groups into poly(arylene sulfide) can be found in U.S. Pat. No. 4,769,424 to Takekoshi et al., which discloses incorporation of substituted thiophenols into halogen substituted poly(arylene sulfide)s. Another functionalizing method involves incorporation of chloro-substituted aromatic compounds containing the desired functionality reacted with an alkali metal sulfide and chloroaromatic compounds. A third functionalizing method involves reaction of poly(arylene sulfide) with a disulfide containing the desired functional groups, typically in the melt or in a suitable high boiling solvent such as chloronapthalene.

Though the melt viscosity of the poly(arylene sulfide) is not particularly limited, a melt viscosity of at least 100 Poise is preferred from the viewpoint of the toughness of the PPS and that of 10,000 Poise or less is preferred from the viewpoint of the moldability. In some embodiments, the poly(arylene sulfide) can have a melt flow rate less than or equal to 100 grams per 10 minutes measured at 316° C. and 5 kilogram load according to ASTM D1238-04c. Specifically, the melt flow rate can be 50 to 100 grams per 10 minutes.

The poly(arylene sulfide) can also be treated to remove unwanted contaminating ions by immersing the resin in deionized water or by treatment with an acid, typically hydrochloric acid, sulfuric acid, phosphoric acid, or acetic acid. For some product applications, it is preferred to have a very low impurity level, represented as the percent by weight ash remaining after burning a poly(arylene sulfide) sample. Typically the ash content is less than or equal to 1 weight percent, specifically less than or equal to 0.5 weight percent, more specifically less than or equal to 0.1 weight percent.

In addition to the poly(arylene ether)-polysiloxane multi-block copolymer and the other polymer, the composition can, optionally, further comprise a flame retardant. A flame retardant is a chemical compound or mixture of chemical compounds capable of improving the flame retardancy of the thermoplastic composition. Suitable flame retardants include organophosphate esters, metal dialkylphosphinates, nitrogen-containing flame retardants, metal hydroxides, and mixtures thereof.

In some embodiments, the flame retardant comprises an organophosphate ester. Exemplary organophosphate ester flame retardants include, but are not limited to, phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bisphenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No. 57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), and mixtures of two or more of the foregoing organophosphate esters.

In some embodiments the organophosphate ester comprises a bis-aryl phosphate having the formula

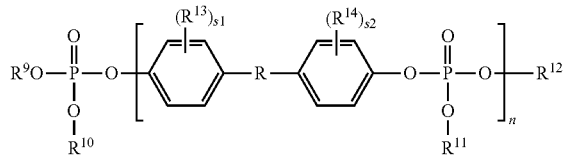

wherein R is independently at each occurrence a $C_1$-$C_{12}$ alkylene group; $R^{13}$ and $R^{14}$ are independently at each occurrence a $C_1$-$C_5$ alkyl group; $R^9$, $R^{10}$, and $R^{12}$ are independently a $C_1$-$C_{12}$ hydrocarbyl group; $R^{11}$ is independently at each occurrence a $C_1$-$C_{12}$ hydrocarbyl group; n is 1 to 25; and s1 and s2 are independently an integer equal to 0, 1, or 2. In some embodiments $OR^9$, $OR^{10}$, $OR^{11}$ and $OR^{12}$ are independently derived from phenol, a monoalkylphenol, a dialkylphenol or a trialkylphenol.

As readily appreciated by one of ordinary skill in the art, the bis-aryl phosphate is derived from a bisphenol. Exemplary bisphenols include 2,2-bis(4-hydroxyphenyl)propane (so-called bisphenol A), 2,2-bis(4-hydroxy-3-methylphenyl) propane, bis(4-hydroxyphenyl)methane, bis(4-hydroxy-3,5-dimethylphenyl)methane and 1,1-bis(4-hydroxyphenyl) ethane. In some embodiments, the bisphenol comprises bisphenol A.

In some embodiments, the flame retardant comprises a metal dialkylphosphinate. As used herein, the term "metal dialkylphosphinate" refers to a salt comprising at least one metal cation and at least one dialkylphosphinate anion. In some embodiments, the metal dialkylphosphinate has the formula

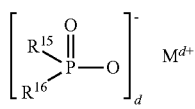

wherein $R^{15}$ and $R^{16}$ are each independently $C_1$-$C_6$ alkyl; M is calcium, magnesium, aluminum, or zinc; and d is 2 or 3. Examples of $R^{15}$ and $R^{16}$ include methyl, ethyl, n-propyl, isopropyl, n-butyl, tert-butyl, n-pentyl, and phenyl. In some embodiments, $R^{15}$ and $R^{16}$ are ethyl, M is aluminum, and d is 3 (that is, the metal dialkylphosphinate is aluminum tris(diethylphosphinate)).

In some embodiments, the metal dialkylphosphinate is in particulate form. The metal dialkylphosphinate particles may have a median particle diameter (D50) less than or equal to 40 micrometers, or, more specifically, a D50 less than or equal to 30 micrometers, or, even more specifically, a D50 less than or equal to 25 micrometers. Additionally, the metal dialkylphosphinate may be combined with a polymer, such as a poly(arylene ether), a polyolefin, a polyamide, a block copolymer, or combination thereof, to form a masterbatch. The metal dialkylphosphinate masterbatch comprises the metal dialkylphosphinate in an amount greater than is present in the thermoplastic composition. Employing a masterbatch for the addition of the metal dialkylphosphinate to the other components of the composition can facilitate addition and improve distribution of the metal dialkylphosphinate.

In some embodiments, the flame retardant comprises a nitrogen-containing flame retardant comprising a nitrogen-containing heterocyclic base and a phosphate or pyrophosphate or polyphosphate acid. In some embodiments, the nitrogen-containing flame retardant has the formula

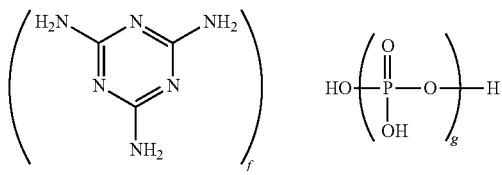

wherein g is 1 to 10,000, and the ratio of f to g is 0.5:1 to 1.7:1, specifically 0.7:1 to 1.3:1, more specifically 0.9:1 to 1.1:1. It will be understood that this formula includes species in which one or more protons are transferred from the phosphate group(s) to the melamine group(s). When g is 1, the nitrogen-containing flame retardant is melamine phosphate (CAS Reg. No. 20208-95-1). When g is 2, the nitrogen-containing flame retardant is melamine pyrophosphate (CAS Reg. No. 15541 60-3). When g is, on average, greater than 2, the nitrogen-containing flame retardant is a melamine polyphosphate (CAS Reg. No. 56386-64-2). In some embodiments, the nitrogen-containing flame retardant is melamine pyrophosphate, melamine polyphosphate, or a mixture thereof. In some embodiments in which the nitrogen-containing flame retardant is melamine polyphosphate, g has an average value of greater than 2 to 10,000, specifically 5 to 1,000, more specifically 10 to 500. In some embodiments in which the nitrogen-containing flame retardant is melamine polyphosphate, g has an average value of greater than 2 to 500. Methods for preparing melamine phosphate, melamine pyrophosphate, and melamine polyphosphate are known in the art, and all are commercially available. For example, melamine polyphosphates may be prepared by reacting polyphosphoric acid and melamine, as described, for example, in U.S. Pat. No. 6,025,419 to Kasowski et al., or by heating melamine pyrophosphate under nitrogen at 290° C. to constant weight, as described in International Patent Application No. WO 98/08898 A1 to Jacobson et al.

The nitrogen-containing flame retardant can have a low volatility. For example, in some embodiments, the nitrogen-containing flame retardant exhibits less than 1 percent weight loss by thermogravimetric analysis when heated at a rate of 20° C. per minute from 25 to 280° C., specifically 25 to 300° C., more specifically 25 to 320° C.

In some embodiments, the flame retardant comprises a metal hydroxide. Suitable metal hydroxides include all those capable of providing fire retardancy, as well as combinations of such metal hydroxides. The metal hydroxide can be chosen to have substantially no decomposition during processing of the fire additive composition and/or flame retardant thermoplastic composition. Substantially no decomposition is defined herein as amounts of decomposition that do not prevent the flame retardant additive composition from providing the desired level of fire retardancy. Exemplary metal hydroxides include, but are not limited to, magnesium hydroxide (for example, CAS Reg. No. 1309-42-8), aluminum hydroxide (for example, CAS Reg. No. 21645-51-2), cobalt hydroxide (for example, CAS Reg. No. 21041-93-0) and combinations of two or more of the foregoing. In some embodiments, the metal hydroxide comprises magnesium hydroxide. In some embodiments the metal hydroxide has an average particle size less than or equal to 10 micrometers and/or a purity greater than or equal to 90 weight percent. In some embodiments it is desirable for the metal hydroxide to contain substantially no water, for example as evidenced by a weight loss of less than 1 weight percent upon drying at 120° C. for 1 hour. In some embodiments the metal hydroxide can be coated, for example, with stearic acid or other fatty acid.

In some embodiments, the flame retardant comprises melamine polyphosphate and magnesium hydroxide.

When present, the flame retardant is added to the composition in an amount of about 5 to about 25 weight percent of a flame retardant, based on the total weight of the thermoplastic composition. Within this range, the flame retardant amount can be about 10 to about 20 weight percent, specifically about 14 to about 18 weight percent. When the flame retardant comprises two or more components, these components can be used an any amount, provided that the total amount of flame retardant is in the range of about 5 to about 25 weight percent.

The thermoplastic composition can, optionally, further comprise additives known in the thermoplastics art. Such additives include, for example, stabilizers, mold release agents, processing aids, drip retardants, nucleating agents, ultraviolet blockers, dyes, pigments, antioxidants, anti-static agents, blowing agents, mineral oil, metal deactivators, anti-blocking agents, and the like, and combinations thereof. Amounts of additives, when present, are typically in the range of about 0.5 to about 5 weight percent, based on the total weight of the composition. Within this range, the amount can be about 1 to about 4 weight percent, specifically about 2 to about 3 weight percent.

One embodiment is an article comprising any of the poly(arylene ether)-polysiloxane multiblock copolymers described herein. Another embodiment is an article comprising the above-described composition comprising the poly(arylene ether)-polysiloxane multiblock copolymer and the other polymer. The poly(arylene ether)-polysiloxane multiblock copolymer and the compositions comprising it are useful for forming articles including, for example, films, substrates for flexible printed wire board, insulation for wire and cable, sealants, automotive parts, electric and electronic packaging components, and the like. The articles can be formed by techniques including extrusion processing, injection molding, and blow molding.

The invention includes at least the following embodiments.

Embodiment 1

A method of preparing a poly(arylene ether)-polysiloxane multiblock copolymer, comprising: reacting a hydroxy-diterminated poly(arylene ether), a hydroxyaryl-diterminated polysiloxane, and an aromatic diacid chloride to form a poly(arylene ether)-polysiloxane multiblock copolymer.

Embodiment 2

The method of embodiment 1, wherein the hydroxy-diterminated poly(arylene ether) has an intrinsic viscosity of about 0.04 to about 0.2 deciliter per gram as measured at 25° C. in chloroform.

Embodiment 3

The method of embodiment 1 or 2, wherein the hydroxy-diterminated poly(arylene ether) has the structure

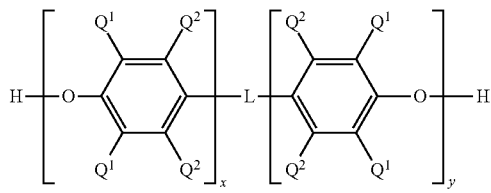

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

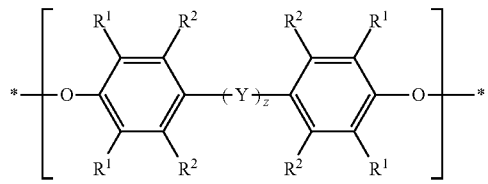

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

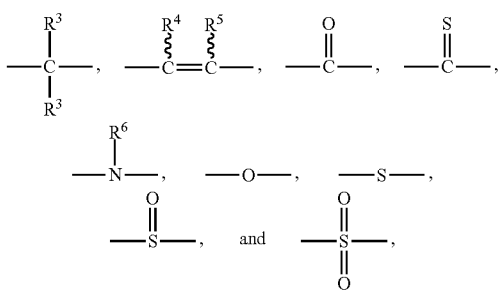

wherein each occurrence of $R^3$-$R^6$ is independently hydrogen or $C_1$-$C_{12}$ hydrocarbyl.

Embodiment 4

The method of any of embodiments 1-3, wherein the hydroxy-diterminated poly(arylene ether) has the structure

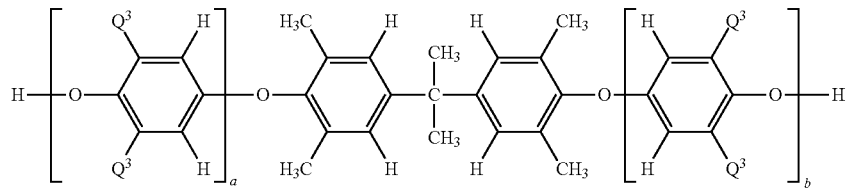

wherein each occurrence of $Q^3$ is independently methyl or di-n-butylaminomethyl; and each occurrence of a and b is independently 0 to about 100, provided that the sum of a and b is, on average, about 3 to about 100.

Embodiment 5

The method of embodiment 4, wherein the sum of a and b is, on average, about 4 to about 30.

Embodiment 6

The method of any of embodiments 1-5, wherein the hydroxyaryl-diterminated polysiloxane comprises a plurality of repeating units having the structure $$\left[ *-\underset{\underset{R^7}{|}}{\overset{\overset{R^7}{|}}{O-Si}}-* \right]$$

wherein each occurrence of $R^7$ is independently hydrogen, $C_1$-$C_{12}$ hydrocarbyl or $C_1$-$C_{12}$ halohydrocarbyl; and two terminal units having the structure $$HO-\underset{Y}{\overset{}{\bigcirc}}-(CH_2)_3-\left[\underset{\underset{R^8}{|}}{\overset{\overset{R^8}{|}}{Si}}\right]-*$$

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halohydrocarbyl.

Embodiment 7

The method of any of embodiments 1-6, wherein the hydroxyaryl-diterminated polysiloxane has the structure $$HO-\underset{H_3CO}{\overset{}{\bigcirc}}-CH_2-CH_2-CH_2-\left[\underset{\underset{CH_3}{|}}{\overset{\overset{CH_3}{|}}{Si}}-O\right]_n-\underset{\underset{CH_3}{|}}{\overset{\overset{CH_3}{|}}{Si}}-CH_2-CH_2-CH_2-\underset{OCH_3}{\overset{}{\bigcirc}}-OH$$

wherein n is, on average, about 5 to about 100.

Embodiment 8

The method of embodiment 7, wherein n is, on average, about to about 15.

Embodiment 9

The method of any of embodiments 1-8, wherein the hydroxy-diterminated poly(arylene ether) and the hydroxyaryl-diterminated polysiloxane are reacted in a weight ratio of about 0.1:1 to about 10:1.

Embodiment 10

The method of any of embodiments 1-9, wherein the aromatic diacid chloride is selected from the group consisting of terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof.

Embodiment 11

The method of any of embodiments 1-10, wherein the aromatic diacid chloride comprises terephthaloyl chloride.

Embodiment 12

The method of any of embodiments 1-11, wherein the aromatic diacid chloride is used in an amount sufficient to provide a molar ratio of acid chloride groups to hydroxy groups of about 0.9:1 to 1.05:1.

Embodiment 13

The method of any of embodiments 1-12, wherein the reacting comprises combining the hydroxy-diterminated poly(arylene ether) and the hydroxyaryl-diterminated polysiloxane; and adding the aromatic diacid chloride to the combined hydroxy-diterminated poly(arylene ether) and hydroxyaryl-diterminated polysiloxane.

Embodiment 14

The method of any of embodiments 1-12, wherein the reacting comprises adding the aromatic diacid chloride and the hydroxyaryl-diterminated polysiloxane to the hydroxy-diterminated poly(arylene ether).

Embodiment 15

The method of any of embodiments 1-12, wherein the reacting comprises adding at least a portion of the aromatic diacid chloride to the hydroxy-diterminated poly(arylene ether), followed by adding at least a portion of the hydroxyaryl-diterminated polysiloxane to the hydroxy-diterminated poly(arylene ether) and the at least a portion of the aromatic diacid chloride.

Embodiment 16

The method of any of embodiments 1-15, wherein the reacting is conducted in the presence of tertiary amine.

Embodiment 17

The method of embodiment 16, wherein the tertiary amine comprises triethylamine.

Embodiment 18

The method of any of embodiments 1-17, wherein the poly(arylene ether)-polysiloxane multiblock copolymer has a number average molecular weight of about 5,000 to about 50,000 atomic mass units.

Embodiment 19

The method of any of embodiments 1-18, wherein the poly(arylene ether)-polysiloxane multiblock copolymer comprises at least two poly(arylene ether) blocks and at least two polysiloxane blocks.

Embodiment 20

The method of any of embodiments 1-20, wherein the poly(arylene ether)-polysiloxane multiblock copolymer comprises about 5 to about 25 poly(arylene ether) blocks and about 10 to about 30 polysiloxane blocks.

Embodiment 21

The method of any of embodiments 1-20, wherein the hydroxy-diterminated poly(arylene ether) has the structure

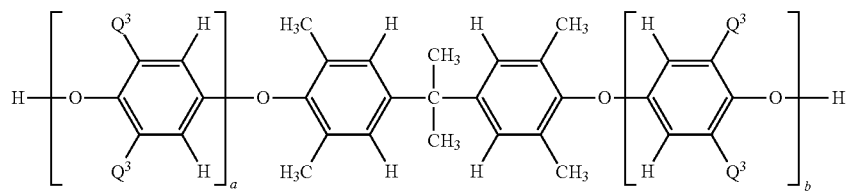

wherein each occurrence of $Q^3$ is independently methyl or di-n-butylaminomethyl; and each occurrence of a and b is independently 0 to about 15, provided that the sum of a and b is, on average, about 4 to about 15; wherein the hydroxyaryl-diterminated polysiloxane has the structure

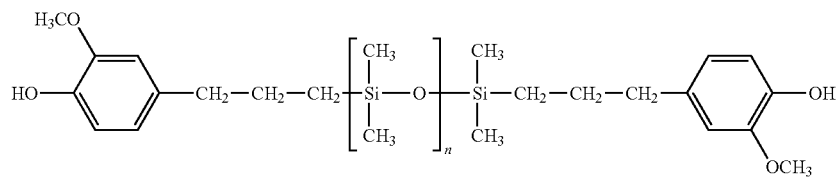

wherein n is, on average, about 5 to about 15; wherein the aromatic diacid chloride comprises terephthaloyl chloride; and wherein the reacting is conducted in the presence of a tertiary amine.

Embodiment 22

A poly(arylene ether)-polysiloxane multiblock copolymer prepared by the method of any of embodiments 1-21.

Embodiment 23

A poly(arylene ether)-polysiloxane multiblock copolymer prepared by the method of embodiment 21.

Embodiment 24

A poly(arylene ether)-polysiloxane multiblock copolymer, comprising: at least two poly(arylene ether) blocks having the structure

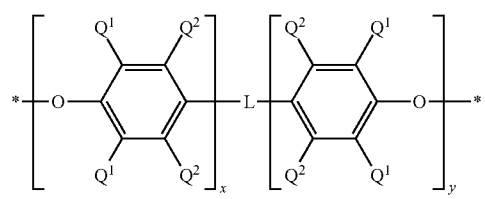

wherein x and y are each independently 0 to about 100, provided that the sum of x and y is at least 2; each occurrence of $Q^1$ is independent selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

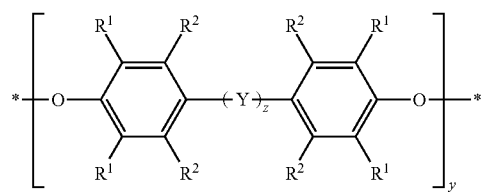

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

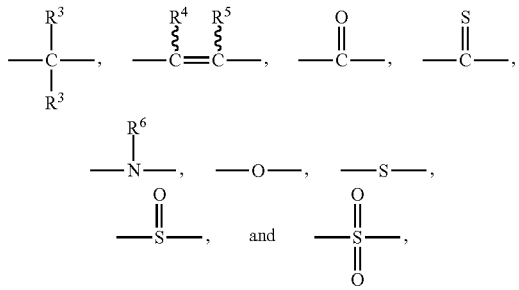

wherein each occurrence of $R^3$-$R^6$ is independently hydrogen or $C_1$-$C_{12}$ hydrocarbyl; at least two polysiloxane blocks having the structure

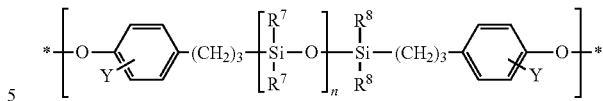

wherein each occurrence of $R^7$ is independently hydrogen, $C_1$-$C_{12}$ hydrocarbyl or $C_1$-$C_{12}$ halohydrocarbyl; Y is hydrogen, $C_1$-$C_{12}$ hydrocarbyl, $C_1$-$C_{12}$ hydrocarbyloxy, or halogen; each occurrence of $R^8$ is independently hydrogen, $C_1$-$C_{12}$ hydrocarbyl or $C_1$-$C_{12}$ halohydrocarbyl; and n is, on average, about 5 to about 100; and at least three block-linking groups, each block-linking group being the residue of an aromatic diacid chloride.

Embodiment 25

The poly(arylene ether)-polysiloxane multiblock copolymer of embodiment 24, wherein the at least two poly(arylene ether) blocks each independently have the structure

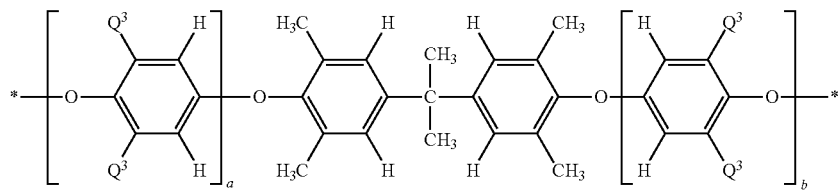

wherein each occurrence of $Q^3$ is independently methyl or di-n-butylaminomethyl; and each occurrence of a and b is independently 0 to about 100, provided that the sum of a and b is, on average, about 3 to about 100.

Embodiment 26

The poly(arylene ether)-polysiloxane multiblock copolymer of embodiment 24 or 25, wherein the at least two polysiloxane blocks have the structure

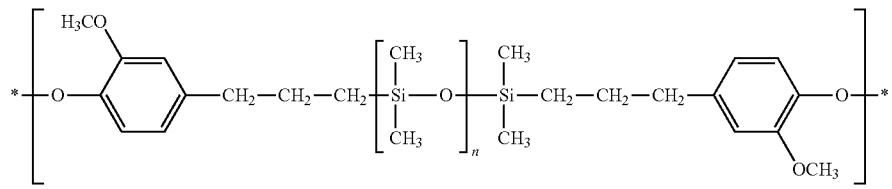

wherein n is, on average, about 5 to about 15.

Embodiment 27

The poly(arylene ether)-polysiloxane multiblock copolymer of any of embodiments 24-26, wherein the aromatic diacid chloride is selected from the group consisting of terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof.

Embodiment 28

The poly(arylene ether)-polysiloxane multiblock copolymer of any of embodiments 24-27, wherein the aromatic diacid chloride comprises terephthaloyl chloride.

Embodiment 29

The poly(arylene ether)-polysiloxane multiblock copolymer of any of embodiments 24-28, having a number average molecular weight of about 5,000 to about 50,000 atomic mass units.

Embodiment 30

The poly(arylene ether)-polysiloxane multiblock copolymer of any of embodiments 24-29, comprising about 5 to about 25 poly(arylene ether) blocks and about 10 to about 30 polysiloxane blocks.

Embodiment 31

The poly(arylene ether)-polysiloxane multiblock copolymer of any of embodiments 24-30, wherein at least 10 percent of the block-linking groups link a poly(arylene ether) block and a polysiloxane block.

Embodiment 32

The poly(arylene ether)-polysiloxane multiblock copolymer of any of embodiments 24-31, wherein the at least two poly(arylene ether) blocks have the structure

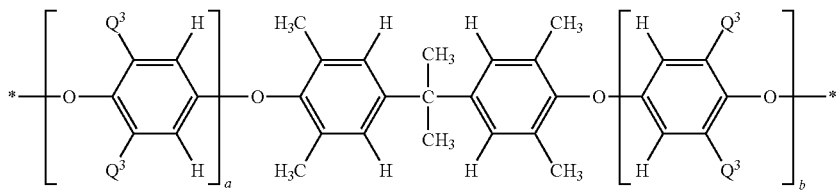

wherein each occurrence of $Q^3$ is independently methyl or di-n-butylaminomethyl; and each occurrence of a and b is independently 0 to about 15, provided that the sum of a and b is, on average, about 4 to about 15; wherein the at least two polysiloxane blocks have the structure

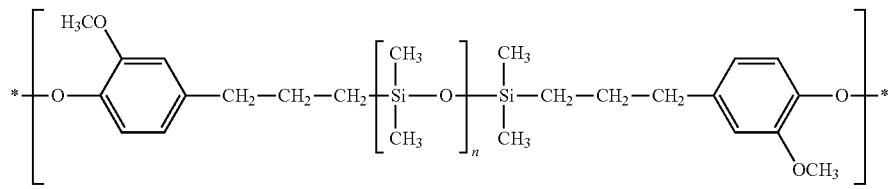

wherein n is, on average, about 5 to about 15; and wherein the at least three block-linking groups have the structure

Embodiment 33

A composition, comprising: the poly(arylene ether)-polysiloxane multiblock copolymer of any of embodiments 22-32; and an other polymer selected from the group consist ing of poly(arylene ether)s, styrenic polymers, polyamides, polyolefins, poly(phenylene sulfide)s, and mixtures thereof.

Embodiment 34

An article comprising the poly(arylene ether)-polysiloxane multiblock copolymer of any of embodiments 22-32.

Embodiment 35

An article comprising the poly(arylene ether)-polysiloxane multiblock copolymer of embodiment 23.

Embodiment 36

An article comprising the poly(arylene ether)-polysiloxane multiblock copolymer of embodiment 24.

Embodiment 37

An article comprising the poly(arylene ether)-polysiloxane multiblock copolymer of embodiment 32

Embodiment 38

An article comprising the composition of embodiment 33.

The invention is further illustrated by the following non-limiting examples.

Examples 1-4, Comparative Examples 1-3

The working examples utilized the materials summarized in Table 1.

In addition to being commercially available, the hydroxy-diterminated poly(arylene ether)s can be prepared according to the procedures described in U.S. Pat. No. 7,541,421 to Carrillo et al. Table 2 characterizes three hydroxy-diterminated poly(arylene ether)s that are representative of the materials used in the present working examples. In Table 2, "Intrinsic viscosity (dL/g)" is the intrinsic viscosity at 25° C. in chloroform, measured by Ubbelohde viscometer; "GPC-$M_n$ (daltons)" is the number average molecular weight determined by gel permeation chromatography using polystyrene standards (uncorrected); "GPC-$M_W$ (daltons)" is the number average molecular weight determined by gel permeation chromatography using polystyrene standards (uncorrected); "GPC-$M_w/M_n$" is the polydispersity index or ratio of weight average molecular weight to number average molecular weight; "$T_g$ (° C.)" is the glass transition temperature determined by differential scanning calorimetry; "NMR-Incorporated Tetramethylbiphenyl (wt %)" is the weight percent of internal groups derived from 3,3',5,5'-tetramethyl-4,4'-biphenol and having the structure

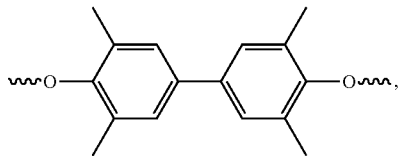

as determined by proton nuclear magnetic resonance spectroscopy ($^1$H NMR); "NMR—Incorporated TMBPA (wt %)" is the weight percent of incorporated internal and terminal

TABLE 1

| Material Designation | Description |
| --- | --- |
| PPE-2OH, 0.06 | Copolymer of 2,6-xylenol and 2,2-bis(4-hydroxy-3,5-dimethylphenyl)propane (CAS Reg. No. 1012321-47-9), having an average of about 1.9 terminal hydroxy groups per molecule and an intrinsic viscosity of 0.06 deciliter per gram in chloroform at 25° C.; obtained as SA60-100-0 from SABIC Innovative Plastics |
| PPE-2OH, 0.09 | Copolymer of 2,6-xylenol and 2,2-bis(4-hydroxy-3,5-dimethylphenyl)propane (CAS Reg. No. 1012321-47-9), having an average of about 1.9 terminal hydroxy groups per molecule and an intrinsic viscosity of 0.09 deciliter per gram in chloroform at 25° C.; obtained as MX90-100-0 from SABIC Innovative Plastics |
| PPE-2OH, 0.12 | Copolymer of 2,6-xylenol and 2,2-bis(4-hydroxy-3,5-dimethylphenyl)propane (CAS Reg. No. 1012321-47-9), having an average of about 1.9 terminal hydroxy groups per molecule and an intrinsic viscosity of 0.12 deciliter per gram in chloroform at 25° C.; obtained as SA120-111 from SABIC Innovative Plastics |
| Eugenol-D10 | Eugenol-diterminated polydimethylsiloxane (CAS Reg. No. 156065-00-8), having an average of about 10 polydimethylsiloxane units per molecule, obtained as Y-17126 from Momentive Performance Materials |
| Eugenol-D30 | Eugenol-diterminated polydimethylsiloxane (CAS Reg. No. 156065-00-8), having an average of about 30 polydimethylsiloxane units per molecule, obtained from Momentive Performance Materials |
| Eugenol-D45 | Eugenol-diterminated polydimethylsiloxane (CAS Reg. No. 156065-00-8), having an average of about 45 polydimethylsiloxane units per molecule, obtained from Momentive Performance Materials |
| TPC | Terephthaloyl chloride (CAS Reg. No. 100-20-9), obtained as 120871-1KG from Sigma Aldrich |
| TEA | Triethylamine (CAS Reg. No. 121-44-8), obtained as 471283-500ML from Sigma Aldrich |
| $CH_2Cl_2$ | Dichloromethane (CAS Reg. No. 75-09-2), obtained from Merck |
| DCE | 1,2-Dichloroethan (CAS Reg. No. 107-06-2), obtained from Merck |
| Toluene | Toluene (CAS Reg. No. 108-88-3), obtained from Merck |
| MeOH | Methanol (CAS Reg. No. 67-56-1), obtained from Merck |
| BzCl | Benzoyl chloride (CAS Reg. No. 98-88-4), obtained from Sigma Aldrich | groups derived from 2,2'-bis(3,5-dimethyl-4-hydroxyphenyl)propane, as determined by $^1$H NMR; "NMR—Incorporated dibutylamine (wt %)" is the weight percent of incorporated N,N-dibutylamino groups, as determined by $^1$H NMR; "NMR—OH per molecule" is the average number of hydroxy groups per molecule, as determined by $^1$H NMR; and "NMR—OH (ppm)" is the hydroxy group content expressed in parts per million by weight, as determined by $^1$H NMR. Details of the respective analyses can be found in U.S. Pat. No. 7,541,421 to Carrillo et al.

TABLE 2

|  | PPE-2OH, 0.12 | PPE-2OH, 0.09 | PPE-2OH, 0.06 |
|---|---|---|---|
| Intrinsic viscosity (dL/g) | 0.116 | 0.087 | 0.067 |
| GPC - $M_n$ (daltons) | 1921 | 1198 | 799 |
| GPC - $M_w$ (daltons) | 4378 | 2477 | 1690 |
| GPC - $M_w/M_n$ | 2.28 | 2.07 | 2.12 |
| $T_g$ (° C.) | 147.8 | 115.8 | 99.6 |
| NMR - Incorporated Tetraraethylbiphenyl (wt %) | 1.25 | 0.83 | 0.68 |
| NMR - Incorporated TMBPA (wt %) | 11.28 | 19.17 | 26.80 |
| NMR - Incorporated dibutylamine (wt %) | 0.50 | 1.05 | 0.86 |
| NMR - OH per molecule | 1.90 | 1.91 | 1.92 |
| NMR - OH (ppm) | 11900 | 21800 | 28200 |

Table 3 characterizes three eugenol-diterminated polydimethylsiloxanes that are representative of the materials used in the present working examples. The three eugenol-diterminated polydimethylsiloxanes have the structure

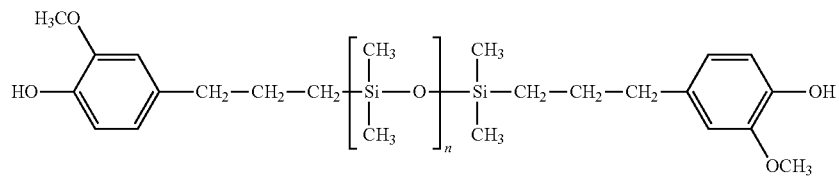

wherein the respective values of "n" are dictated by the respective number average molecular weight values presented in Table 3.

TABLE 3

|  | Eugenol-D10 | Eugenol-D30 | Eugenol-D45 |
|---|---|---|---|
| GPC - $M_n$ (daltons) | 1249 | 1748 | 4630 |
| GPC - $M_w$ (daltons) | 1725 | 3229 | 7321 |
| GPC - $M_w/M_n$ | 1.38 | 1.85 | 1.58 |
| NMR - OH (ppm) | 27,221 | 14,062 | 7,884 |

Before being used in synthetic procedures, terephthaloyl chloride is purified. A first purification procedure includes the following steps. Prepare a 20% weight/volume solution of the commercially-procured terephthaloyl chloride in dichloromethane. Filter the resulting solution under anhydrous conditions to remove undissolved terephthalic acid. Transfer the filtrate comprising of terephthalic acid-free solution to a dry one-necked round bottomed flask. Remove the dichloromethane by rotary evaporation at 40° C. and a pressure of 100 millimeters of mercury. Continue the rotary evaporation for at least 3 hours to ensure complete removal of the solvent. Store the purified terephthaloyl chloride under anhydrous conditions and use it within 4 days of its purification.

An alternative purification procedure includes the following steps. Prepare a 20% weight/volume solution of commercially-procured terephthaloyl chloride in hot hexane. Filter out the undissolved terephthalic acid under hot conditions. Transfer the filtrate comprising the terephthalic acid-free hot solution to a dry one-necked round bottomed flask and allow it to cool. On cooling, needle-like crystals of the acid chloride recrystallize out of the hexane. Decant the hexane and remove any residual hexane from the recrystallized acid chloride by rotary evaporation for at least 3 hours.

A typical polymerization procedure using unstarved conditions is as follows. Make a 20% weight/volume solution of the purified acid chloride in dichloromethane and transfer it to an addition funnel. Under anhydrous condition, make a 20% weight/volume solution of the hydroxy-diterminated poly (arylene ether) in dichloromethane and transfer it to a two-neck reaction flask kept at room temperature. With efficient stirring in the reaction flask, gradually pour a 20% weight/volume solution of the hydroxyaryl-diterminated polysiloxane in dichloromethane into the reaction flask. Once a homogenous solution is obtained, add a 20% weight/volume solution of triethylamine in dichloromethane to the homogenous reaction mass while continuing to stir the reaction flask contents. Begin drop-wise addition of the terephthaloyl chloride solution and maintain an addition rate such that the entire solution is added into the reaction flask within 60 minutes. After addition of the terephthaloyl chloride solution has been completed, continue the reaction for an additional three hours. An increase in solution viscosity over time will be observed. After a total reaction time of 4 hours, terminate the stirring of the reaction mixture and slowly pour the reaction mixture volume into six volumes of methanol with vigorous stirring, causing precipitation of the block copolymer product. Continue stirring for at least one hour to facilitate removal of trapped dichloromethane and dissolution of the triethylammonium hydrochloride salt byproduct in methanol. Slowly decant the methanol, isolate the product copolymer (e.g., by filtration), and dry the product copolymer in vacuum at 80° C. The absence of any substantial amount of poly (arylene ether) multiblock copolymer (lacking any siloxane blocks) is indicated by the solubility of the isolated product in hexane. The absence of any substantial amount of polysiloxane multiblock copolymer (lacking any poly(arylene ether) blocks is indicated by the insolubility of the isolated product in isododecane.

Four poly(arylene ether)-polysiloxane multiblock copolymers were prepared as Examples 1-4 using variations in the weight percent siloxane feed and the polysiloxane chain length. Held constant were the hydroxy-diterminated poly (arylene ether) type (PPE-2OH, 0.09), the reaction temperature (25° C.), and the molar ratio of acid chloride groups to hydroxy groups (0.95:1).

Three comparative poly(arylene ether)-polysiloxane block copolymers were also prepared. Comparative Example 1 corresponds to a polyphenylene ether-polysiloxane-polyphenylene ether triblock copolymer with imide linkages between the blocks, prepared by reacting an amine-diterminated polydimethylsiloxane with a maleic anhydride-grafted polyphenylene ether (maleic anhydride having been used at 1.6 parts by weight per 100 parts by weight polyphenylene ether). Specifically, Comparative Example 1 is Entry 3 from Table 3 of U.S. Pat. No. 4,814,392 to Shea et al., which was not independently reproduced. Comparative Examples 2 and 3 correspond to poly(arylene ether)-polysiloxane-poly(arylene ether) triblock copolymers prepared by polymerization of 2,6-dimethylphenol in the presence of eugenol-diterminated polydimethylsiloxane according to the procedure of copending U.S. patent application Ser. No. 12/277,835, filed Nov. 25, 2008 using 20 weight percent loading of a Eugenol-D45 polysiloxane.

Characteristics of the resulting multiblock copolymers are summarized in Table 4. In Table 4, "PPE Feed (Wt %)" is the weight percent hydroxy-diterminated poly(arylene ether) based on the total weight of hydroxyaryl-diterminated polysiloxane and the hydroxy-diterminated poly(arylene ether)]; "Siloxane Feed (Wt %)" is the weight percent hydroxyaryl-diterminated polysiloxane based on the total weight of hydroxyaryl-diterminated polysiloxane and the hydroxy-diterminated poly(arylene ether); "Siloxane D-Length" is the number of dimethylsiloxane repeat units in the eugenol-diterminated polydimethylsiloxane, with "D10" corresponding to the use of "Eugenol-D10", and "D45" corresponding to the use of "Eugenol-D45" (see the Table 1 and Table 3 descriptions of these materials); "Copolymer Architecture" refers to the block copolymer architecture, with "ABA Triblock" corresponding to a poly(arylene ether)-polysiloxane-poly (arylene ether) block copolymer, and "AB Multiblock" corresponding to a multiblock copolymer having multiple poly (arylene ether) block and multiple polydimethylsiloxane blocks. In Table 4, "Siloxane Incorporation Efficiency (%)" is the weight percent of the siloxane feed that is incorporated into the product block copolymer, as determined by $^1$H NMR based on a comparison of the ratio of dimethylsiloxane groups to phenyl-bound methyl groups in the product copolymer to the ratio of eugenol-diterminated polydimethylsiloxane to hydroxy-diterminated poly(arylene ether) in the reaction mixture. In mathematical terms, $$\text{Siloxane\_Incorporation\_Efficiency} = \frac{\text{Incorporated\_Siloxane\_Wt\%}}{\text{Siloxane\_Wt\%\_in\_Feed}} \times 100$$

where $$\text{Incorporated\_Siloxane\_Wt\%} = \frac{X}{X+Y} \times 100$$

$$X = \left[\frac{\text{Peak ``C'' integral @ 0.6 ppm}}{\text{Methyl protons per siloxane repeat unit}}\right] *$$

Molecular weight of siloxane repeat unit $$Y = \left[\frac{\text{Peak ``B'' integral @ 2.11 ppm}}{\text{Methyl protons per xylenol repeat unit}}\right] *$$

Molecular weight of xylenol repeat unit

As a specific illustration of siloxane incorporation efficiency for Example 2 in Table 4, $$X = (14.1/6) \times 74 = 173.9,$$

$$Y = (6.2/6) \times 120 = 124,$$

$$\text{Incorporated\_Siloxane\_Wt\%} = \frac{173.9}{173.9 + 124} \times 100 = 59.17$$

$$\text{Silxane\_Incorporation\_Efficiency} = \frac{59.17}{60.00} \times 100 = 98.16$$

Also in Table 4, "Linkage Type" refers to the chemical linkage between blocks of the multiblock copolymer. For the present multiblock copolymer the linkage type is always an aromatic ester.

Also in Table 4, "Mole fraction P-T-P, theoretical" is the theoretical mole fraction of poly(arylene ether)-terephthaloyl-poly(arylene ether) linkages, calculated based on $^{13}$C NMR determination of the mole fractions of poly(arylene ether) and polysiloxane blocks and assuming random formation of linkages. "Mole fraction P-T-P, actual" is calculated based on $^{13}$C NMR determination of the mole relative populations of distinctive terephthaloyl resonances. "Mole fraction S-T-S, theoretical" is the theoretical mole fraction of polysiloxane-terephthaloyl-polysiloxane linkages, calculated based on $^{13}$C NMR determination of the mole fractions of poly(arylene ether) and polysiloxane blocks and assuming random formation of linkages. "Mole fraction S-T-S, actual" is calculated based on $^{13}$C NMR determination of the mole relative populations of distinctive terephthaloyl resonances. "Mole fraction P-T-S, theoretical" is the theoretical mole fraction of poly(arylene ether)-terephthaloyl-polysiloxane linkages, calculated based on $^{13}$C NMR determination of the mole fractions of poly(arylene ether) and polysiloxane blocks and assuming random formation of linkages. "Mole fraction P-T-S, actual" calculated based on $^{13}$C NMR determination of the mole relative populations of distinctive terephthaloyl resonances.

Also in Table 4, "Reaction Yield (%)" is the reaction yield based on a comparison of the weight of isolated product to the sum of the theoretical weights of poly(arylene ether) blocks, polysiloxane blocks, and terephthaloyl linkages derived from the reactants, accounting for the limiting reagent. "$M_n$ (amu)" is the number average molecular weight, expressed in atomic mass units (amu), determined by gel permeation chromatography using polystyrene standards. "$M_w$ (amu)" is the weight average molecular weight, expressed in atomic mass units (amu), determined by gel permeation chromatography using polystyrene standards. "$M_w/M_n$" is the polydispersity or ratio of weight average molecular weight to number average molecular weight. "Residual —OH ends (ppm)" is the content of free (terminal) hydroxy groups, as determined by $^{31}$P NMR after phosphorus derivatization of the hydroxyl groups of the isolated sample as described in K. P. Chan et al., "Facile Quantitative Analysis of Hydroxyl End Groups of Poly(2,6-dimethyl-1,4-phenylene oxide)s by $^{31}$P NMR Spectroscopy", *Macromolecules*, volume 27, pages 6371-6375 (1994). "DSC $T_g$ (° C.)" is the glass transition temperature of the poly (arylene ether) blocks, as determined by differential scanning calorimetry. "TGA Decomposition Peak (° C.)" is the peak temperature in a plot of the derivative of weight versus temperature as determined by derivative thermogravimetric analysis (dTGA). "MVR @ 280° C./2.16 kg" is the melt volume-flow rate, expressed in units of milliliters per 10 minutes (mL/10 min), measured according to ASTM D1238-04c, using a temperature of 280° C. and a load of 2.16 kilograms. "Tensile Modulus (MPa)" is the tensile modulus, expressed in units of megapascals (MPa); "Tensile Stress @ Break (MPa)", is the tensile stress at break, expressed in units of megapascals; "Tensile Elongation @ Break (%)" is the tensile elongation at break, expressed in percent; all of the foregoing tensile properties were measured at 23° C. according to ASTM D638-08. "Hardness (Shore D)", is the Shore D durometer hardness, expressed without units, measured at 23° C. according to ASTM D2240-05. "NII @ 23° C. (kJ/m$^2$)" and "NII @ 0° C. (kJ/m$^2$)" are notched Izod impact strength values at 23° C. and 0° C., respectively, expressed in units of kilojoules per meter$^2$, measured according to ISO 180/A1. "MAI Total Energy @ 23° C. (J)" and "MAI Total Energy @ 0° C. (J)" are multi-axial impact strengths, expressed in units of joules (J), measured at 23° C. and 0° C., respectively, on 3.2 millimeter thick, 102 millimeter diameter discs according to ASTM D3763-08; a "(D)" following the reported value denotes ductile failure, and a "(B)" following the reported value denotes brittle failure. "VST (° C.)" is Vicat Softening Temperature, expressed in units of degrees centigrade, measured according to ASTM D1525-07.

In Table 4, "UL 94 Rating, 2 mm" and "UL 94 Rating, 1.6 mm" are Vertical Burn Test ratings measured at sample thicknesses of 2 millimeters and 1.6 millimeters, respectively, according to Underwriter's Laboratory Bulletin 94, "Tests for Flaminability of Plastic Materials, UL 94", Vertical Burning Flame Test. In this procedure, a test bar with 125 millimeter length, 12.5 millimeter width, and the stated thickness is mounted vertically. A 1.9 centimeter (three-quarter inch) flame is applied to the end of the test bar for 10 seconds and removed. The time to extinguish is measured for ten samples, and the standard deviation calculated (first burn time; "UL 94 FOT T1, 2 mm (sec)" and "UL 94 FOT T1, 1.6 mm (sec)" in Table 4). The flame is reapplied for another 10 seconds and removed. The time to extinguish is measured (second burn time; "UL 94 FOT T2, 2 mm (sec)" and "UL 94 FOT T2, 1.6 mm (sec)" in Table 4). For a V-0 rating, no individual burn times from the first or second flame application may exceed 10 seconds; the total of the burn times for any five specimens may not exceed 50 seconds; and drip particles that ignite a piece of cotton gauze situated below the specimen are not allowed; burn-to-clamps is not allowed. For a V-1 rating, no individual burn times from the first or second flame application may exceed 30 seconds; the total of the burn times for any five specimens may not exceed 250 seconds; and drip particles that ignite a piece of cotton gauze situated below the specimen are not allowed. For a V-2 rating, no individual burn times from the first or second flame application may exceed 30 seconds; the total of the burn times for any five specimens may not exceed 250 seconds; and drip particles that ignite a piece of cotton gauze situated below the specimen are allowed, but burn-to-clamps is not allowed. "UL 94 Drip, 2 mm" and "UL 94 Drip, 1.6 mm" are visual observations of dripping measured during vertical burn testing at sample thicknesses of 2 millimeters and 1.6 millimeters, respectively, with a value of "ND" corresponding to no drips observed, and a value of "D" corresponding to at least one drip observed.

The results in Table 4 show that the present multiblock copolymers exhibit higher molecular weight, improved tensile elongation relative to Comparative Examples 1-3.

In order to determine whether the isolated multiblock copolymer contains a significant amount of free hydroxyaryl-diterminated polysiloxane or homopolymerized hydroxyaryl-diterminated polysiloxane, the Example 4 product was analyzed as-isolated and after washing the as-isolated product with hexane. The hydroxyaryl-diterminated polysiloxane is known to be soluble in hexane, whereas the hydroxy-diterminated poly(arylene ether) is known to have a very low room temperature solubility in hexane. Specifically 2 grams of the Example 1 as-isolated multiblock copolymer were washed with 20 grams of hexane at room temperature. Using quantitative $^{13}$C NMR, the as-isolated multiblock copolymer was found to contain 78.28 weight percent poly(arylene ether) and 21.72 weight percent polysiloxane, based on the total weight of poly(arylene ether) and polysiloxane. The hexane-washed multiblock copolymer was found to contain 79.44 weight percent poly(arylene ether) and 20.54 weight percent polysiloxane. Thus, washing with hexane produced only a small (1.16) weight percent change in the polysiloxane content. This experiment shows that the isolation multiblock copolymer consists essentially of the desired product and contains only a very small amount of free hydroxyaryl-diterminated polysiloxane and homopolymerized hydroxyaryl-diterminated polysiloxane.

TABLE 4

|  | Ex. 1 | Ex. 2 | Ex. 3 | Ex. 4 |
|---|---|---|---|---|
| PPE Feed (Wt %) | 80 | 40 | 30 | 20 |
| Siloxane Feed (Wt %) | 20 | 60 | 70 | 80 |
| Siloxane D-Length | D10 | D10 | D10 | D10 |
| Copolymer Architecture | AB Multiblock | AB Multiblock | AB Multiblock | AB Multiblock |
| Siloxane Incorporation Efficiency (%) | 92.85 | 98.2 | 98.15 | 99.77 |
| Linkage Type | Aromatic Ester | Aromatic Ester | Aromatic Ester | Aromatic Ester |
| Mole fraction P-T-P, theoretical | — | 0.1201 | 0.0605 | 0.0266 |
| Mole fraction P-T-P, actual | — | 0.15 | 0.09 | 0.04 |
| Mole fraction P-T-S, theoretical | — | 0.4529 | 0.3710 | 0.2730 |
| Mole fraction P-T-S, actual | — | 0.30 | 0.28 | 0.16 |
| Mole fraction S-T-S, theoretical | — | 0.4270 | 0.5686 | 0.7004 |
| Mole fraction S-T-S, actual | — | 0.52 | 0.63 | 0.78 |
| Reaction Yield (%) | 92.85 | 91.25 | 91.11 | 90.74 |
| $M_n$ (amu) | 21968 | 28382 | 33917 | 40430 |
| $M_w$ (amu) | 43707 | 54821 | 61060 | 69634 |
| $M_w/M_n$ | 1.995 | 1.932 | 1.801 | 1.722 |
| Residual —OH ends (ppm) | 2901.12 | 1975 | 1792.46 | 1545.37 |
| DSC $T_g$ (° C.) | 187.14 | 184.54 | 148 | 145 |
| TGA Decomposition Peak (° C.) | 469.22 | 470.49 | — | — |
| MVR @ 280° C./2.16 kg (mL/10 min) | 4.12 | 152.3 | 190.2 | >200 |
| Tensile Modulus (MPa) | 1878.42 | 249.41 | 115.95 | 47.3 |
| Tensile Stress @ Break (MPa) | 34.54 | 8.21 | 3.16 | 1.01 |
| Tensile Elongation @ Break (%) | 17.56 | 41.84 | 106.05 | 196.13 |
| Hardness (Shore D) | 88 | 64 | 44 | 15 |
| NII @ 23° C. (kJ/m$^2$) | 13.7 | 16.75 | 22.263 | No Break |
| NII @ 0° C. (kJ/m$^2$) | 11.653 | 12.088 | 18.444 | No Break |
| MAI Total Energy @ 23° C. (J) | 26.172 (D) | 55.227 (D) | 65.661 (D) | 58.327 (D) |
| MAI Total Energy @ 0° C. (J) | 21.73 (D) | 58.537 (D) | 55.9 (D) | 53.088 (D) |
| VST (° C.) | 198.2 | 77.18 | 57.2 | — |

TABLE 4-continued

|  |  |  |  |  |
|---|---|---|---|---|
| UL 94 Rating, 2 mm | V0 | V0 | V0 | V0 |
| UL 94 FOT T1, 2 mm (sec) | 2.18 (0.82) | 1.78 (0.36) | 4.35 (2.45) | 6.24 (3.16) |
| UL 94 FOT T2, 2 mm (sec) | 2.92 (0.82) | 3.1 (1.22) | 6.575 (1.6) | 3.06 (3.04) |
| UL 94 Drip, 2 mm | ND | ND | D | D |
| UL 94 Rating, 1.6mm | V0 | V0 | V2 | V2 |
| UL 94 FOT T1, 1.6 mm (sec) | 1.94 (0.39) | 2.5 (0.78) | 3.42 (1.39) | 4.04 (0.73) |
| UL 94 FOT T2, 1.6 mm (sec) | 1.78 (0.77) | 2.92 (2.75) | 3.9 (0.99) | 2.54 (1.56) |
| UL 94 Drip, 1.6 mm | ND | ND | D | D |

|  | C. Ex. 1 | C. Ex. 2 | C. Ex. 3 |
|---|---|---|---|
| Siloxane Feed (Wt %) | 18 | 20 | 20 |
| Siloxane D-Length | D200 | D45 | D10 |
| Copolymer Architecture | ABA Triblock | ABA Triblock | ABA Triblock |
| Siloxane Incorporation Efficiency (%) | — | 70 | 26 |
| Linkage Type | Imide | Ether | Ether |
| Mole fraction P-T-P, theoretical | — | — | — |
| Mole fraction P-T-P, actual | — | — | — |
| Mole fraction P-T-S, theoretical | — | — | — |
| Mole fraction P-T-S, actual | — | — | — |
| Mole fraction S-T-S, theoretical | — | — | — |
| Mole fraction S-T-S, actual | — | — | — |
| Reaction Yield (%) | — | — | — |
| $M_n$ (amu) | — | 14000 | 4600 |
| $M_w$ (amu) | — | 32000 | 7900 |
| $M_w/M_n$ | — | 2.3 | 1.7 |
| Residual —OH ends (ppm) | — | — | — |
| DSC $T_g$ (° C.) | — | 195 | — |
| TGA Decomposition Peak (° C.) | — | 210 | — |
| MVR @ 280° C./2.16 kg (mL/10 min) | — | — | — |
| Tensile Modulus (MPa) | — | 1940 | — |
| Tensile Stress @ Break (MPa) | 42 | 50 | — |
| Tensile Elongation @ Break (%) | 16 | 8 | — |
| Hardness (Shore D) | — | 90 | — |
| NII @ 23° C. (kJ/m$^2$) | 14.8 | 6.86 | — |
| NII @ 0° C. (kJ/m$^2$) | — | — | — |
| MAI Total Energy @ 23° C. (J) | — | 18.5 | — |
| MAI Total Energy @ 0° C. (J) | — | — | — |
| VST (° C.) | — | — | — |
| UL 94 Rating, 2 mm | — | V0 | — |
| UL 94 FOT T1, 2 mm (sec) | — | 1.6 (0.3) | — |
| UL 94 FOT T2, 2 mm (sec) | — | 16.9 (13.4) | — |
| UL 94 Drip, 2 mm | — | — | — |
| UL 94 Rating, 1.6 mm | — | — | — |
| UL 94 FOT T1, 1.6 mm (sec) | — | — | — |
| UL 94 FOT T2, 1.6 mm (sec) | — | — | — |
| UL 94 Drip, 1.6 mm | — | — | — |

Examples 5-8

These examples represent additional inventive examples conducted according to the general procedure of Examples 1-4. Reaction conditions and properties are summarized in Table 5.

The results in Table 5 show the effects of polysiloxane amount and polysiloxane block length on copolymer material performance. A particularly desirable property balance is exhibited by multiblock copolymers incorporating Eugenol-D 10 blocks.

Figure 3:
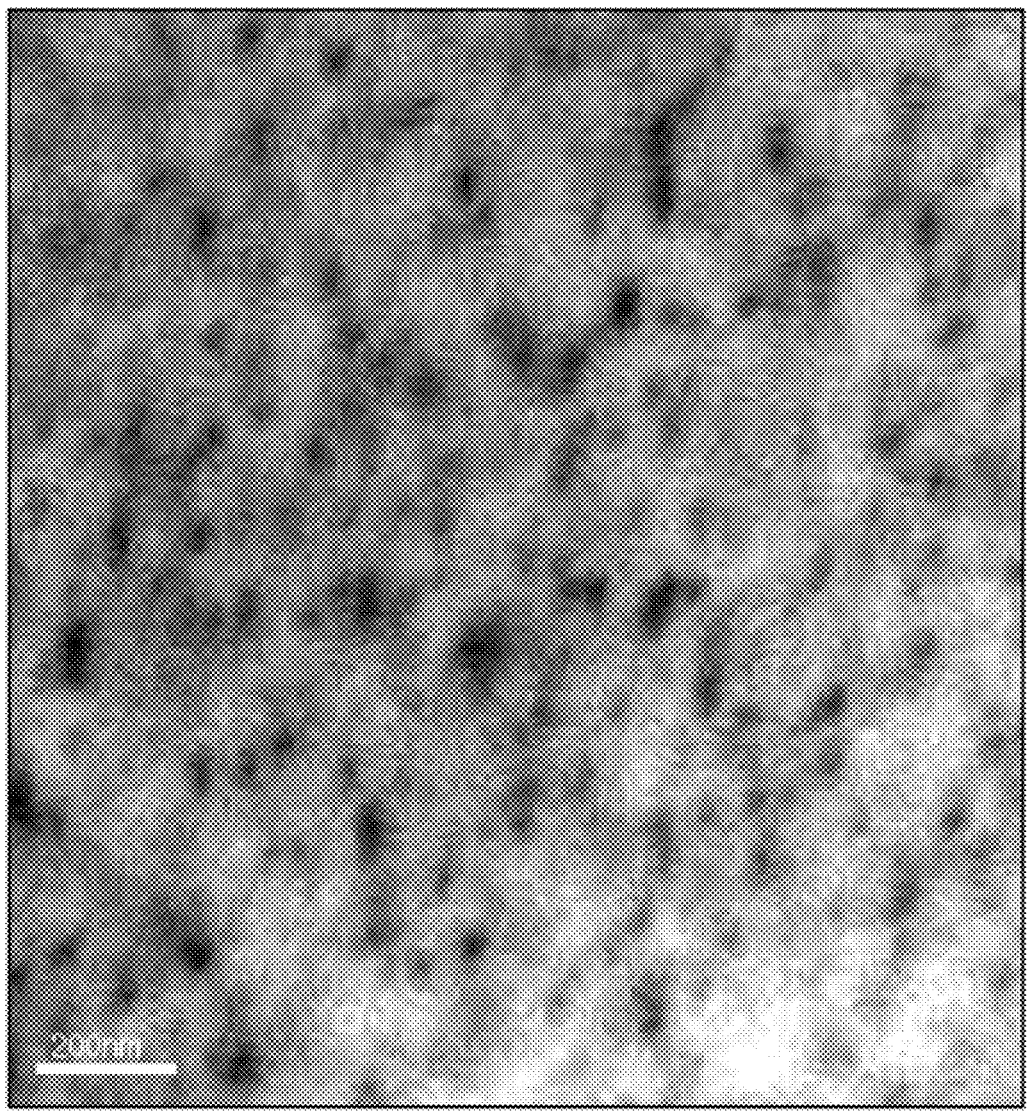
FIG. 3 is photomicrograph of a comparative block copolymer material prepared via oxidative polymerization of 2,6-dimethylphenol in the presence of a hydroxyaryl-diterminated polysiloxane.
Figure 4:
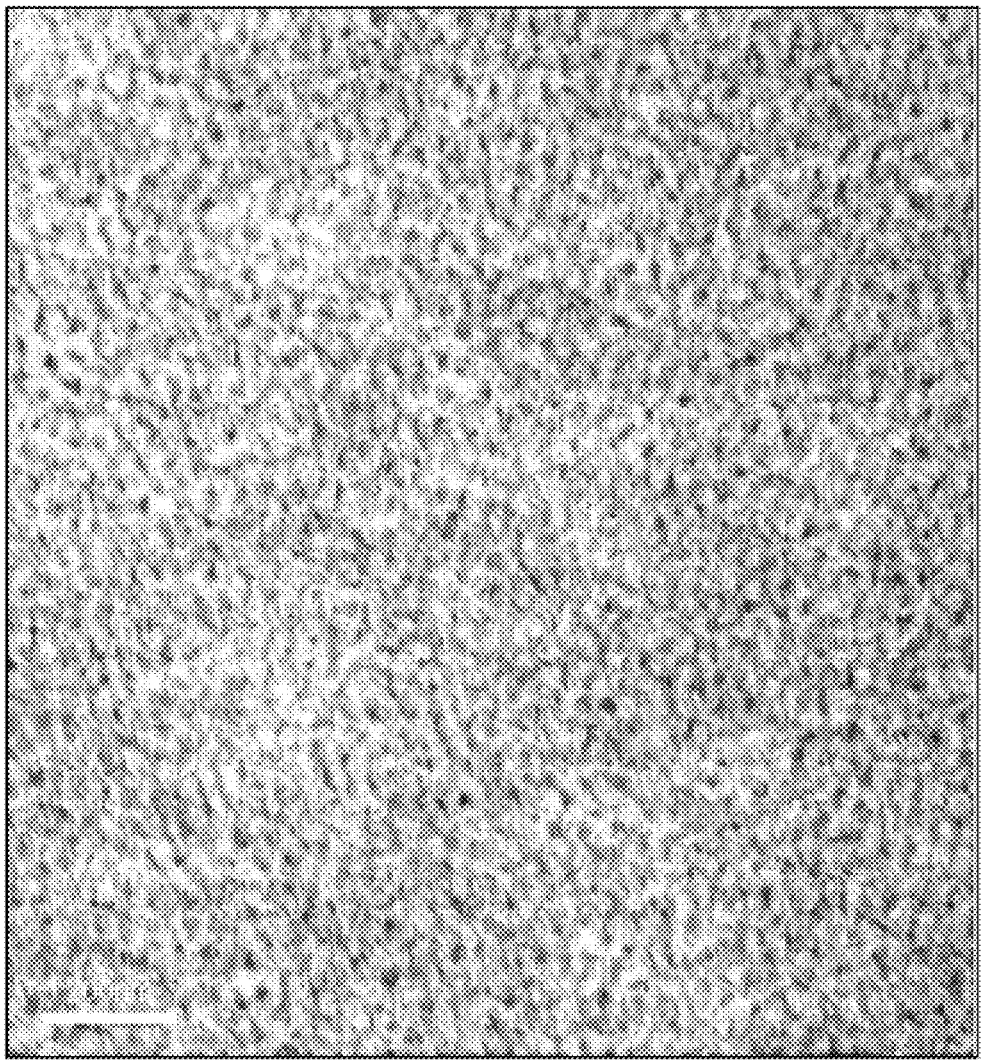
FIG. 4 is photomicrograph of a multiblock copolymer material prepared via the present polyesterification method.

The effect of synthesis method on material morphology can be seen in a comparison of FIGS. 3 and 4. FIG. 3 is a scanning transmission electron microscope (STEM) image of the Comparative Example 2 block copolymer made by oxidative coupling of 80 weight percent 2,6-dimethylphenol in the presence of 20 weight percent the Eugenol-D45 hydroxyaryl-diterminated polysiloxane. FIG. 4 is a corresponding STEM image of the Example 5 multiblock copolymer prepared by the present polyesterification method using 20 weight percent of the Eugenol-D45 hydroxyaryl-diterminated polysiloxane and 80 weight percent of the PPE-2OH 0.09 hydroxy-diterminated poly(arylene ether). In the images, the polysiloxane regions are dark, and the poly(arylene ether) regions are light. The images show that the Example 5 multiblock copolymer exhibits smaller polysiloxane regions than the Comparative Example 2 block copolymer.

TABLE 5

|  | Ex. 5 | Ex. 6 | Ex. 7 | Ex. 8 |
|---|---|---|---|---|
| PPE Feed (Wt %) | 80 | 40 | 80 | 40 |
| Siloxane Feed (Wt %) | 20 | 60 | 20 | 60 |
| Siloxane D-Length | D45 | D45 | D30 | D30 |
| Copolymer Architecture | AB Multiblock | AB Multiblock | AB Multiblock | AB Multiblock |
| PPE Incorporation (Wt %) | 76.74 | 34.51 | 75.37 | 36.64 |
| Siloxane Incorporation (Wt %) | 23.26 | 65.49 | 24.63 | 63.36 |

TABLE 5-continued

|  | Ex. 5 | Ex. 6 | Ex. 7 | Ex. 8 |
|---|---|---|---|---|
| Linkage Type | Aromatic Ester | Aromatic Ester | Aromatic Ester | Aromatic Ester |
| Reaction Yield (%) | 94.16 | 96.67 | 95.23 | 92.64 |
| $M_n$ (amu) | 21720 | 40982 | 19534 | 36455 |
| $M_w$ (amu) | 49837 | 79745 | 46552 | 73675 |
| $M_w/M_n$ | 2.294 | 1.945 | 2.383 | 2.02 |
| Residual —OH ends (ppm) | 2513.41 | 1250.03 | 2875.92 | 1649.23 |
| DSC $T_g$ (° C.) | 195.76 | 188.58 | 187.73 | 184.54 |
| TGA Decomposition Peak (° C.) | 474.11 | 476.32 | 471.62 | 471.2 |
| MVR @ 280° C./2.16 kg (mL/10 min) | 2.9 | 17.9 | 3.32 | 50.468 |
| Tensile Modulus (MPa) | 1925.96 | 125.49 | 1847.21 | 145.49 |
| Tensile Stress @ Break (MPa) | 35.31 | 3.15 | 35.57 | 4.12 |
| Tensile Elongation @ Break (%) | 3.26 | 8.52 | 2.79 | 10.43 |
| Hardness (Shore D) | 86 | 26 | 84 | 46 |
| NII @ 23° C. (kJ/m$^2$) | 3.852 | 3.852 | 3.708 | 11.4 |
| NII @ 0° C. (kJ/m$^2$) | 3.094 | 4.305 | 2.413 | 10.238 |
| MAI Total Energy @ 23° C. (J) | 5.4325 (B) | 10.468 (B) | 4.897 (B) | 30.146 (D) |
| MAI Total Energy @ 0° C. (J) | 4.216 (B) | 9.41 (B) | 1.925 (B) | 31.33 (D) |
| VST (° C.) | 185.6 | 60.2 | 192.7 | 85.9 |
| UL 94 Rating, 2 mm | V0 | V1 | V0 | V1 |
| UL 94 FOT T1, 2 mm (sec) | 2.57 (0.4) | 17.6 (4.96) | 2.38 (0.32) | 5.34 (2.46) |
| UL 94 FOT T2, 2 mm (sec) | 3.10 (0.95) | 13.48 (10.02) | 3.5 (2.01) | 10.22 (3.23) |
| UL 94 Drip, 2 mm | ND | ND | ND | ND |
| UL 94 Rating, 1.6 mm | V0 | HB | V1 | V1 |
| UL 94 FOT T1, 1.6 mm (sec) | 4.46 (0.92) | 23.88 (4.54) | 6.96 (4.25) | 7.48 (1.76) |
| UL 94 FOT T2, 1.6 mm (sec) | 3.26 (1.35) | 9.62 (13.23) | 3.46 (1.81) | 6.68 (1.49) |
| UL 94 Drip, 1.6 mm | ND | ND | ND | ND |

Example 9

This example illustrates another inventive example conducted according to the general procedure of Examples 1-4. The block copolymer synthesis reaction utilized "PPE-2OH, 0.09" and "Eugenol D-10", a reaction temperature of 25° C., a molar ratio of acid chloride groups to hydroxy groups of 0.95:1, and addition of acid chloride all at once rather than over a period of one hour. The resulting block copolymer had a number average molecular weight (MO of 32,617 atomic mass units, a weight average molecular weight ($M_w$) of 62,165 atomic mass units, a polydispersity ($M_w/M_n$) of 1.906. $^{13}$C NMR was used to calculate the actual and theoretical mole fractions of block linkages. The multiblock copolymer contained 0.3346 mole percent of poly(arylene ether) blocks and 0.6654 mole percent of polysiloxane blocks. If one assumes a random distribution of linkages between poly(arylene ether) and polysiloxane blocks, the mole fraction of poly(arylene ether)-terephthaloyl-poly(arylene ether) linkages would be 0.3346×0.3346=0.1120; the mole fraction of polysiloxane-terephthaloyl-polysiloxane linkages would be 0.6654×0.6654=0.4427; and the mole fraction of poly(arylene ether)-terephthaloyl-polysiloxane linkages would be 2×0.3346×0.6654=0.4453. The distinctive $^{13}$C NMR resonances corresponding to the different terephthaloyl groups were used to calculate an actual mole fraction of poly(arylene ether)-terephthaloyl-poly(arylene ether) linkages of 0.14; an actual mole fraction of polysiloxane-terephthaloyl-polysiloxane linkages of 0.48; and an actual mole fraction of poly(arylene ether)-terephthaloyl-polysiloxane linkages of 0.36.

Examples 10-14

These examples illustrate the effect of varying the ratio of hydroxy groups to acid chloride groups. All reactions used "PPE-2OH, 0.09" and "Eugenol D-10" (both present in the reaction flask before addition of terephthaloyl chloride), a reaction temperature of 25° C., a reaction time of four hours, 20 weight percent hydroxyaryl-diterminated polysiloxane based on the sum of hydroxyaryl-diterminated polysiloxane and hydroxy-diterminated poly(arylene ether), and 20 weight percent total of hydroxyaryl-diterminated polysiloxane and hydroxy-diterminated poly(arylene ether) based on the total weight of the reaction mixture. The molar ratio of acid chloride groups (from terephthaloyl chloride) to hydroxy groups (from hydroxyaryl-diterminated polysiloxane and hydroxy-diterminated poly(arylene ether)) was varied from 0.9:1 to 1.03:1. Results are summarized in Table 6, where "COCl: OH" is the molar ratio of acid chloride groups to hydroxy groups, and "GELS" indicates that the polymer formed a gelled mass in the reactor. The results show that weight average molecular weight increases as COCl:OH is increased from 0.9:1 to 1.03:1. However, number average molecular weight was maximized at 0.95:1.

TABLE 6

|  | Ex. 10 | Ex. 11 | Ex. 12 | Ex. 13 | Ex. 14 |
|---|---|---|---|---|---|
| COCl:OH | 0.9:1 | 0.95:1 | 0.98:1 | 1.03:1 | 1.035:1 |
| $M_n$ (amu) | 17056 | 29843 | 25974 | 26423 | GELS |
| $M_w$ (amu) | 38831 | 54079 | 56942 | 70788 | GELS |
| $M_w/M_n$ | 2.282 | 1.813 | 2.206 | 2.696 | GELS |

Examples 16-31

These examples illustrate the effect of solvent type on the polymerization reaction.

A number of solvents were initially screened for the polyesterification reaction: ortho-dichloro benzene (ODCB), acetonitrile (ACN), ethylene dichloride (EDC), octamethylcyclotetrasiloxane (D4), toluene (TOL), and dichloromethane (DCM). For each solvent, a solution was prepared containing 20 weight/volume percent of terephthaloyl chloride and 0.75 molar equivalents of triethylamine. Table 7 lists the room temperature solubilities and solvations as observed in the respective solvents. In Table 7, "DC" is the dielectric constant, "Solubility" is a subjective characterization of the solubility of the terephthaloyl ammonium chloride ionic species at 23° C. "Solvation of Ions" is the dissociation and subsequent stabilization of the ions originating from terephthaloyl ammonium chloride in solution of the solvents mentioned, visually examined by the propensity of formation of ionic clusters (better solvation corresponding to less cluster formation). "Boiling point (° C.)" is the solvent boiling point at one atmosphere, and "Flash Point (° C.)" is the solvent flash point.

TABLE 7

| Solvent | DC | Solubility | Solvation of Ions | Boiling point (° C.) | Flash Point (° C.) |
|---|---|---|---|---|---|
| ODCB | 2.8 | Good | Poor | 180 | 66 |
| AN | 37.5 | Worst | Worst | 82 | 6 |
| EDC | 7.9 | Good | Good | 83 | 15 |
| D4 | 2.2 | Poor | Worse | 175 | 54 |
| TOL | 2.4 | Good | Fair | 111 | 4 |
| DCM | 9.1 | Good | Excellent | 39 | 12 |

Table 8 provides comparisons of the multiblock copolymer products of syntheses conducted in toluene at 65° C. and in dichloromethane at 25° C. All experiments used "PPE-2OH, 0.06" as the hydroxy-diterminated poly(arylene ether) and "Eugenol-D45" as the hydroxy-diterminated polysiloxane. In the toluene reaction mixtures, the product multiblock copolymer formed a thick, viscous mass. The toluene reaction mixtures also exhibited lower molecular weights than the dichloromethane reaction mixtures.

TABLE 8

|  | Ex. 16 | Ex. 17 | Ex. 18 | Ex. 19 | Ex. 20 | Ex. 21 |
|---|---|---|---|---|---|---|
| Solvent | DCM | TOL | DCM | TOL | DCM | TOL |
| Reaction temp. (° C.) | 25 | 65 | 25 | 65 | 25 | 65 |
| Reaction time (hours) | 4 | 7 | 4 | 7 | 4 | 7 |
| PPE Feed (Wt %) | 80 | 80 | 70 | 70 | 60 | 60 |
| Siloxane Feed (Wt %) | 20 | 20 | 30 | 30 | 40 | 40 |
| PPE Incorporation (Wt %) | 75.84 | 73.1 | 74.9 | 68.69 | 51.9 | 59.8 |
| Siloxane Incorporation (Wt %) | 24.16 | 26.9 | 35.1 | 31.31 | 48.1 | 40.2 |
| $M_n$ (amu) | 19693 | 12156 | 22762 | 11993 | 24579 | 15408 |
| $M_w$ (amu) | 43407 | 19150 | 49346 | 20069 | 56397 | 30780 |
| $M_w/M_n$ | 2.21 | 1.573 | 2.16 | 1.673 | 2.29 | 1.997 |
| TGA Decomposition Peak (° C.) | 471.14 | 478.2 | 472.94 | 470.89 | 476.18 | 482.37 |
| Reaction Yield (%) | 92 | 90 | 93 | 86 | 91 | 84 |
| DSC $T_g$ (° C.) | 184.9 | 156.96 | 184.31 | 156.01 | 190.23 | 156.96 |

|  | Ex. 22 | Ex. 23 | Ex. 24 | Ex. 25 |
|---|---|---|---|---|
| Solvent | DCM | TOL | DCM | TOL |
| Reaction temp. (° C.) | 25 | 65 | 25 | 65 |
| Reaction time (hours) | 4 | 7 | 4 | 7 |
| PPE Feed (Wt %) | 50 | 50 | 40 | 40 |
| Siloxane Feed (Wt %) | 50 | 50 | 60 | 60 |
| PPE Incorporation (Wt %) | 43.85 | 40.48 | 32.27 | 36.02 |
| Siloxane Incorporation (Wt %) | 56.15 | 59.52 | 67.73 | 63.98 |
| $M_n$ (amu) | 26948 | 17979 | 30860 | 19517 |
| $M_w$ (amu) | 61777 | 32989 | 60877 | 36368 |
| $M_w/M_n$ | 2.268 | 1.834 | 1.969 | 1.863 |
| TGA Decomposition Peak (° C.) | 479.31 | 484.46 | 476.18 | 480.29 |
| Reaction Yield (%) | 92 | 81 | 91 | 75 |
| DSC $T_g$ (° C.) | 178.88 | 150.63 | 180.06 | 152.24 |

Table 9 provides comparisons of the multiblock copolymer products of syntheses conducted in dichloromethane at 25° C. and 1,2-ethylenedichloride at reflux (about 83° C.). All experiments used "PPE-2OH, 0.09" as the hydroxy-diterminated poly(arylene ether) and "Eugenol-D10" as the hydroxy-diterminated polysiloxane. The dichloromethane reactions used an acid chloride to hydroxy group molar ratio of 1.03:1, whereas the 1,2-ethylenedichloride reactions used an acid chloride to hydroxy group molar ratio of 0.95:1. The dichloromethane reactions used 80 weight percent hydroxy-diterminated poly(arylene ether) and 20 weight percent hydroxy-diterminated polysiloxane, whereas the 1,2-ethylenedichloride reactions used 40 weight percent hydroxy-diterminated poly(arylene ether) and 60 weight percent hydroxy-diterminated polysiloxane. So, the effect of solvent is confounded with both the effect of acid chloride to hydroxy group molar ratio and the effect of macromer composition.

TABLE 9

|  | Ex. 26 | Ex. 27 | Ex. 28 | Ex. 29 | Ex. 30 | Ex. 31 |
|---|---|---|---|---|---|---|
| Solvent | DCM | EDC | DCM | EDC | DCM | EDC |
| Reaction temp. (° C.) | 25 | 83 | 25 | 83 | 25 | 83 |
| Reaction time (hours) | 4 | 4 | 4 | 4 | 4 | 4 |
| PPE Feed (Wt %) | 80 | 40 | 80 | 40 | 80 | 40 |
| Siloxane Feed (Wt %) | 20 | 60 | 20 | 60 | 20 | 60 |
| PPE Incorporation (Wt %) | 77.23 | 41.62 | 75.79 | 37.07 | 80.55 | 39.06 |
| Siloxane Incorporation (Wt %) | 22.77 | 58.38 | 24.21 | 62.93 | 19.45 | 60.94 |
| $M_n$ (amu) | 18598 | 26146 | 19711 | 28596 | 19666 | 34442 |
| $M_w$ (amu) | 44514 | 65546 | 47059 | 65417 | 61985 | 70408 |
| $M_w/M_n$ | 2.393 | 2.506 | 2.387 | 2.288 | 3.163 | 2.044 |
| TGA Decomposition Peak (° C.) | 444.68 | 433.64 | 447.3 | 436.9 | 452.77 | 450.96 |
| Reaction Yield (%) | 96.56 | 96.62 | 96.22 | 93.78 | 96.6 | 96.32 |
| DSC $T_g$ (° C.) | 195.37 | 180.98 | 200.1 | 192.2 | 203 | 182.89 |

Examples 32-64

These experiments illustrate the effects of poly(arylene ether) block length and polysiloxane block length. The reactions were conducted according to the general conditions of Examples 1-4, using dichloromethane solvent, a 25° C. reaction temperature, rapid mixing of all reactants, and a four hour reaction time.

In a first set of experiments, a hydroxyaryl-diterminated polysiloxane of D-length 45 (Eugenol-D45) was used in combination with hydroxy-diterminated poly(arylene ether)s of two different intrinsic viscosities (PPE-2OH, 0.06; and PPE-2OH, 0.09). The macromer composition was also varied over the range 20 to 60 weight percent of the siloxane soft block. Reaction conditions and product block copolymer properties are summarized in Table 10. The results show that the use of the hydroxy-diterminated poly(arylene ether) having an intrinsic viscosity of 0.09 deciliter per gram produced high molecular weight multiblock copolymers, even after accounting for the molecular weight difference between the 0.06 dL/g and 0.09 dL/g poly(arylene ether) macromers.

In a second set of experiments, a series of hydroxyaryl-diterminated polysiloxanes of D-lengths 10 (Eugenol-D 10) to 100 (Eugenol-D 100) was used in combination with a hydroxy-diterminated poly(arylene ether) having an intrinsic viscosity of 0.09 dL/g (PPE-2OH, 0.09). The macromer composition was also evaluated at 20 and 60 weight percent of the siloxane soft block. Reaction conditions and product block copolymer properties are summarized in Table 11. The results show that higher molecular weights were obtained as the weight percent polysiloxane in the monomer feed increased from 20 to 60 weight percent. The same trend was observed with all the polysiloxane D-lengths. The level of the soft block incorporated into the copolymer had a minimal effect on the glass transition of the hard PPE blocks.

TABLE 11

|  | Ex. 42 | Ex. 43 | Ex. 44 | Ex. 45 |
|---|---|---|---|---|
| PPE-2OH, 0.09 (Wt %) | 80 | 80 | 80 | 80 |
| Eugenol-D10 (Wt %) | 20 | — | — | — |

TABLE 10

|  | Ex. 32 | Ex. 33 | Ex. 34 | Ex. 35 | Ex. 36 |
|---|---|---|---|---|---|
| PPE-2OH, 0.06 (Wt %) | 80 | 70 | 60 | 50 | 40 |
| PPE-2OH, 0.09 (Wt %) | — | — | — | — | — |
| Eugenol-D45 (Wt %) | 20 | 30 | 40 | 50 | 60 |
| PPE Incorporation (Wt %) | 75.84 | 74.9 | 51.9 | 43.85 | 32.27 |
| Siloxane Incorporation (Wt %) | 24.16 | 35.1 | 48.1 | 56.15 | 67.73 |
| $M_n$ (amu) | 19693 | 22762 | 24579 | 26948 | 30860 |
| $M_w$ (amu) | 43407 | 49346 | 56397 | 61777 | 60877 |
| $M_w/M_n$ | 2.21 | 2.16 | 2.29 | 2.268 | 1.969 |
| TGA Decomposition Peak (° C.) | 471.14 | 472.94 | 476.18 | 479.31 | 476.18 |
| Reaction Yield (%) | 92 | 93 | 91 | 92 | 91 |
| DSC $T_g$ (° C.) | 184.9 | 184.31 | 190.23 | 178.88 | 180.06 |

|  | Ex. 37 | Ex. 38 | Ex. 39 | Ex. 40 | Ex. 41 |
|---|---|---|---|---|---|
| PPE-2OH, 0.06 (Wt %) | — | — | — | — | — |
| PPE-2OH, 0.09 (Wt %) | 80 | 70 | 60 | 50 | 40 |
| Eugenol-D45 (Wt %) | 20 | 30 | 40 | 50 | 60 |
| PPE Incorporation (Wt %) | 80.77 | 69.44 | 59.24 | 45.67 | 30.86 |
| Siloxane Incorporation (Wt %) | 19.23 | 30.56 | 40.26 | 54.33 | 61.14 |
| $M_n$ (amu) | 24764 | 29826 | 33198 | 34642 | 38724 |
| $M_w$ (amu) | 55360 | 64298 | 71813 | 74370 | 78417 |
| $M_w/M_n$ | 2.236 | 2.156 | 2.163 | 2.147 | 2.025 |
| TGA Decomposition Peak (° C.) | 470.44 | 474.11 | 476.32 | 475.28 | 477.87 |
| Reaction Yield (%) | 93 | 92 | 92 | 91 | 93 |
| DSC $T_g$ (° C.) | 184.9 | 184.31 | 190.23 | 178.88 | 180.06 |

TABLE 11-continued

| | | | | |
|---|---|---|---|---|
| Eugenol-D30 (Wt %) | — | 20 | — | — |
| Eugenol-D45 (Wt %) | — | — | 20 | — |
| Eugenol-D100 (Wt %) | — | — | — | 20 |
| $M_n$ (amu) | 25974 | 20970 | 24764 | 17836 |
| $M_w$ (amu) | 56942 | 53660 | 55360 | 51562 |
| $M_w/M_n$ | 2.206 | 2.566 | 2.235 | 2.892 |

| | Ex. 46 | Ex. 47 | Ex. 48 | Ex. 49 |
|---|---|---|---|---|
| PPE-2OH, 0.09 (Wt %) | 40 | 40 | 40 | 40 |
| Eugenol-D10 (Wt %) | 60 | — | — | — |
| Eugenol-D30 (Wt %) | — | 60 | — | — |
| Eugenol-D45 (Wt %) | — | — | 60 | — |
| Eugenol-D100 (Wt %) | — | — | — | 60 |
| $M_n$ (amu) | 24918 | 27120 | 38724 | 32285 |
| $M_w$ (amu) | 64827 | 68863 | 78417 | 77047 |
| $M_w/M_n$ | 2.601 | 2.538 | 2.025 | 2.402 |

In a third set of experiments, a series of hydroxyaryl-diterminated polysiloxanes of D-lengths 10 (Eugenol-D10), 30 (Eugenol-D30), and 45 (Eugenol-D45) was used in combination with a hydroxy-diterminated poly(arylene ether) having an intrinsic viscosity of 0.09 dL/g (PPE-2OH, 0.09). The macromer composition was also evaluated at 20, 30, 40, 50, and 60 weight percent of the hydroxyaryl-diterminated polysiloxanes. Reaction conditions and product block copolymer properties are summarized in Table 12. Higher molecular weight hydroxyaryl-diterminated polysiloxanes produced higher molecular weight multiblock copolymers at the same macromer composition

TABLE 12

| | Ex. 50 | Ex. 51 | Ex. 52 | Ex. 53 | Ex. 54 |
|---|---|---|---|---|---|
| PPE-2OH, 0.09 (Wt %) | 80 | 70 | 60 | 50 | 40 |
| Eugenol-D10 (Wt %) | 20 | 30 | 40 | 50 | 60 |
| Eugenol-D30 (Wt %) | — | — | — | — | — |
| Eugenol-D45 (Wt %) | — | — | — | — | — |
| PPE Incorporation (Wt %) | 81.83 | 70.61 | 60.14 | 49.97 | 40.3 |
| Siloxane Incorporation (Wt %) | 18.17 | 29.39 | 39.86 | 50.03 | 59.7 |
| $M_n$ (amu) | 13098 | 11929 | 6393 | 14779 | 7284 |
| $M_w$ (amu) | 32361 | 28544 | 44903 | 36155 | 43958 |
| $M_w/M_n$ | 3.094 | 2.391 | 7.427 | 2.544 | 5.507 |
| TGA Decomposition Peak (° C.) | 474.08 | 469.22 | 470.49 | 464.38 | 474.48 |
| Reaction Yield (%) | 92 | 93 | 90 | 91 | 92 |
| DSC $T_g$ (° C.) | 171.4 | 173.2 | 180.4 | 181.6 | 182.1 |
| | Ex. 55 | Ex. 56 | Ex. 57 | Ex. 58 | Ex. 59 |
| PPE-2OH, 0.09 (Wt %) | 80 | 70 | 60 | 50 | 40 |
| Eugenol-D10 (Wt %) | — | — | — | — | — |
| Eugenol-D30 (Wt %) | 20 | 30 | 40 | 50 | 60 |
| Eugenol-D45 (Wt %) | — | — | — | — | — |
| PPE Incorporation (Wt %) | 73.9 | 73 | 48.9 | 48.1 | 37.31 |
| Siloxane Incorporation (Wt %) | 26.1 | 27 | 41.1 | 51.9 | 62.69 |
| $M_n$ (amu) | 21751 | 23199 | 27206 | 29649 | 35498 |
| $M_w$ (amu) | 50748 | 50759 | 67020 | 67275 | 73602 |
| $M_w/M_n$ | 2.333 | 2.18 | 2.46 | 2.27 | 2.073 |
| TGA Decomposition Peak (° C.) | 473.91 | 476.14 | 470.87 | 471.62 | 471.2 |
| Reaction Yield (%) | 91 | 90 | 92 | 92 | 90 |
| DSC $T_g$ (° C.) | 184.23 | 182.7 | 186.23 | 180.69 | 183.23 |
| | Ex. 60 | Ex. 61 | Ex. 62 | Ex. 63 | Ex. 64 |
| PPE-2OH, 0.09 (Wt %) | 80 | 70 | 60 | 50 | 40 |
| Eugenol-D10 (Wt %) | — | — | — | — | — |
| Eugenol-D30 (Wt %) | — | — | — | — | — |
| Eugenol-D45 (Wt %) | 20 | 30 | 40 | 50 | 60 |
| PPE Incorporation (Wt %) | — | — | — | — | — |
| Siloxane Incorporation (Wt %) | — | — | — | — | — |
| $M_n$ (amu) | 24764 | 29826 | 33198 | 34642 | 38724 |
| $M_w$ (amu) | 55360 | 64298 | 71813 | 74370 | 78417 |
| $M_w/M_n$ | 2.236 | 2.156 | 2.163 | 2.147 | 2.025 |
| TGA Decomposition Peak (° C.) | 470.44 | 474.11 | 476.32 | 475.28 | 477.87 |
| Reaction Yield (%) | 93 | 92 | 92 | 91 | 93 |
| DSC $T_g$ (° C.) | 199.52 | 200.12 | 200.672 | 200.15 | 199.81 |

Examples 65-68

These examples illustrate end-capping of the multiblock copolymer.

Evaluation of the melt stability of the multiblock copolymers of Table 5 using parallel plate rheometry revealed a trend in which lower stabilities were observed for multiblock copolymers with higher concentrations of residual hydroxy groups See FIG. 1. While residual hydroxy group content is not the sole determinant of melt stability, higher concentrations of hydroxy groups are significantly correlated with lower melt stability.

Figure 2:
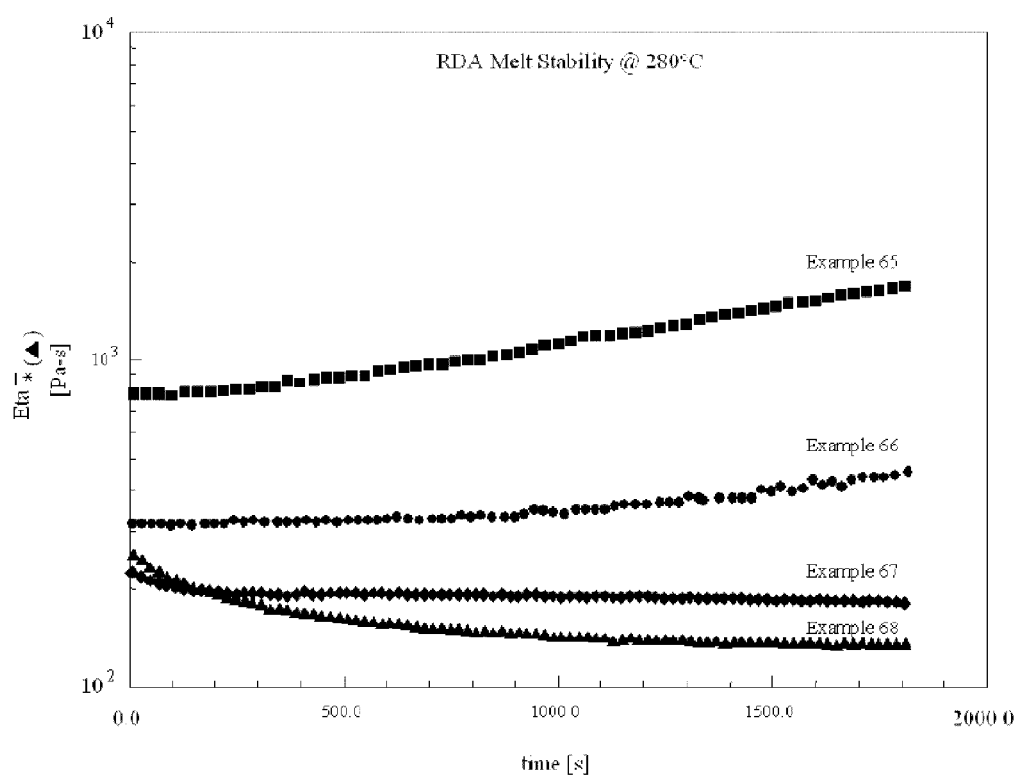
FIG. 2 also relates to melt stability and is a plot of viscosity versus time for a series of multiblock copolymers varying in extent of endcapping.

In order to increase the stability of the multiblock copolymers, a three-hour polyesterification was followed by gradual addition of benzoyl chloride in a three-fold excess relative to the concentration of residual hydroxy groups. This reaction produced a benzoyl-capped multiblock copolymer. The reaction mixture was samples after reaction times of 30, 90, and 120 minutes after benzoyl chloride addition. FIG. 2 shows the melt stabilities of multiblock copolymer without capping (Example 65; 1975 ppm hydroxy groups), and after 30 minutes (Example 66; 1815 ppm), 90 minutes (Example 67; 802 ppm), and 120 minutes (Example 68; 123 ppm) reaction with benzoyl chloride. These data show that capping the residual hydroxy groups markedly increases the melt stability of the multiblock copolymer.

Examples 69-70

These examples illustrate the synthesis of benzoyl-capped multiblock copolymers. Both examples used an acid chloride to hydroxy group molar ratio of 0.99:1, a one hour terephthaloyl chloride addition time, a 25° C. reaction temperature, a four hour reaction time (including the one hour terephthaloyl chloride addition time), a 3:1 molar ratio of benzoyl chloride capping agent to residual hydroxy groups, a 20 minute benzoyl chloride addition time, and a 2 hour benzoyl chloride reaction time following complete addition of benzoyl chloride.

Properties of the resulting multiblock copolymers are summarized in Table 13. "Tension Set at 48 hours (%)" was measured according to ASTM D412-06ae2. "Trouser Tear Strength, Type T (kN/m)" was measured according to ASTM D624-00 (2007). "Dielectric Strength (kV/mm)" was measured according to ASTM D149-09 at a frequency of 500 volts/sec. Dielectric constants (Dk) and dissipation factors (Df) were determined according to ASTM D150-98 (2004). Volume resistivity and surface resistivities were measured according to ASTM D275-07. The smoke density parameters "DS4 (min)" and "DSMax (min)" were measured according to ASTM E662-09.

TABLE 13

|  | Ex. 69 | Ex. 70 |
|---|---|---|
| PPE-2OH, 0.09 (Wt %) | 40 | 30 |
| Eugenol-D10 (Wt %) | 60 | 70 |
| PPE Incorporation (Wt %) | 42.5 | 32.62 |
| Siloxane Incorporation (Wt %) | 57.5 | 67.38 |
| Reaction Yield (%) | 90+ | 90+ |
| $M_n$ (amu) | 37000 | 39000 |
| $M_w$ (amu) | 72000 | 82000 |
| $M_w/M_n$ | 1.945 | 1.9 |
| Residual —OH ends (ppm) | 53.87 | 61.46 |
| DSC $T_g$ (° C.) | 147.83 | 144.6 |
| TGA Decomposition Peak (° C.) | 472.6 | 465.9 |
| MVR @ 280° C./2.16 kg (mL/10 min) | 6.62 | 38.8 |
| Tensile Modulus (MPa) | 313.41 | 118.02 |
| Tensile Stress @ Break (MPa) | 12.07 | 7.87 |
| Tensile Elongation @ Break (%) | 66.27 | 191.08 |
| Hardness (Shore D) | 58 | 40 |
| NII @ 0° C. (kJ/m$^2$) | 22.36 | 36.67 |
| NII @ −30° C. (kJ/m$^2$) | 12.788 | 24.088 |
| MAI Total Energy @ 0° C. (J) | 67.29 (D) | 76.19 (D) |
| MAI Total Energy @ −30° C. (J) | 57.88 (D) | 58.7 (D) |
| Tension Set at 48 hours (%) | 33.34 | 20.08 |
| Trouser Tear Strength, Type T (kN/m) | 34.95 | 17.8 |
| VST (° C.) | 85 | 55 |
| Dielectric Strength (kV/mm) | 27.89 | 26.65 |
| Dk (100 MHz) | 2.784 | 2.782 |
| Dk (500 MHz) | 2.729 | 2.71 |
| Dk (1000 MHz) | 2.596 | 2.543 |
| Df (100 MHz) | 0.0078 | 0.0074 |
| Df (500 MHz) | 0.0057 | 0.0051 |
| Df (1000 MHz) | 0.0048 | 0.0037 |
| Volume Resistivity (Ohm-cm) | 1.25E+13 | 2.12E+12 |
| Surface Resistivity (Ohm) | 1.57E+15 | 4.09E+14 |
| UL 94 Rating (2 mm) | V0 | V0 |
| UL 94 FOT T1 at 2 mm (sec) | 1.6 (0.68) | 3.23 (1.07) |
| UL 94 FOT T2 at 2 mm (sec) | 4.2 (1.7) | 1.74 (1.32) |
| UL 94 Drip at 2 mm | 10/10 ND | 10/10 D |
| UL 94 Rating at 1.6 mm | V0 | V2 |
| UL 94 FOT T1 at 1.6 mm (sec) | 1.58 (0.26) | 3.69 (1.55) |
| UL 94 FOT T2 at 1.6 mm (sec) | 4.19 (1.37) | 0.71 (.97) |
| UL 94 Drip at 1.6 mm | 10/10 ND | 10/10 D |
| UL 94 Rating at 1 mm | V2 | V2 |
| UL 94 FOT T1 at 1 mm (sec) | 3.98 (2.86) | 2.92 (0.98) |
| UL 94 FOT T2 at 1 mm (sec) | 2.85 (3.23) | 3.3 (3.02) |
| UL 94 Drip at 1 mm | 10/10 D | 10/10 D |
| UL 94 Rating at 0.8 mm | V2 | V2 |
| UL 94 FOT T1 at 0.8 mm (sec) | 3.12 (1.45) | 5.52 (2.96) |
| UL 94 FOT T2 at 0.8 mm (sec) | 0.94 (1.24) | 2.18 (2.04) |
| UL 94 Drip at 0.8 mm | 9/10 D | 10/10 D |
| Smoke DS4 (min) | 89.67 | 36.67 |
| Smoke DSMax (min) | 229 | 106 |

Examples 71-72

These examples illustrate the use of starved copolyesterification to increase the frequency of poly(arylene ether)-terephthaloyl-polysiloxane linkages and decrease the frequency of polysiloxane-terephthaloyl-polysiloxane linkages.

For both Examples 71 and 72, the reagents included PPE-2OH, 0.06 (25 grams), Eugenol-D45 (25 grams), triethylamine (7.82 grams), terephthaloyl chloride (5.89 grams), dichloromethane (637.1), and methanol (3822.6).

For example 71, the hydroxyaryl-diterminated polysiloxane was initially present in the reaction mixture with the hydroxy-diterminated poly(arylene ether). For Example 72, the following procedure for starved copolyesterification was used. Make a 20% weight/volume solution of the purified acid chloride and transfer it to an addition funnel. Under anhydrous condition, make a 20% weight/volume solution of the hydroxy-diterminated poly(arylene ether) in dichloromethane and transfer into the two-necked reaction flask kept at room temperature. Prepare a 20% weight/volume solution of the hydroxyaryl-diterminated polysiloxane in dichloromethane and transfer it into another addition funnel. To the hydroxy-diterminated poly(arylene ether) solution in the reaction pot, triethylamine (20% weight/volume in dichloromethane) is added to with stirring. The addition funnels containing the 20% solution of the terephthaloyl chloride and 20% solution of the hydroxyaryl-diterminated polysiloxane are mounded onto the two necks of the reaction flask. Add the terephthaloyl chloride solution drop-wise to the reaction flask over the course of about 60 minutes. Thirty minutes into the addition of terephthaloyl chloride solution, initiate dropwise addition of the hydroxyaryl-diterminated polysiloxane solution and continue at a rates such that addition is completed in about 60 minutes. After completing the addition of the terephthaloyl chloride solution, continue the reaction for an additional 3 hours, then stop the stirring and slowly pour the reaction mixture into a six-fold excess of methanol under vigorous stirring. The copolymer precipitates, and the stirring is continued for at least an hour to ensure complete removal of trapped dichloromethane and dissolution of triethylammonium hydrochloride salt. The methanol is then slowly decanted and the isolated copolymer is dried in vacuum at 80° C.

Results are presented in Table 14. Relative to the unstarved procedure of Example 71, the starved procedure of Example 72 increased the frequency of poly(arylene ether)-terephthaloyl-poly(arylene ether) linkages and decreased the frequencies of poly(arylene ether)-terephthaloyl-polysiloxane linkages and polysiloxane-terephthaloyl-polysiloxane linkages. The Example 72 multiblock copolymer prepared by starved copolymerization also exhibits improved tensile strength at break and elongation at break relative to the Example 71 multiblock copolymer prepared by unstarved copolymerization. The two multiblock copolymers also exhibit different morphologies, with the Example 71 (unstarved) multiblock copolymer exhibiting large (1-5 micron) polysiloxane domains (FIG. 3), and the Example 72 (starved) multiblock copolymer exhibiting small (5-100 nanometer) polysiloxane domains (FIG. 4).

TABLE 14

|  | Ex. 71 | Ex. 72 |
| --- | --- | --- |
| Mole fraction PPE blocks | 0.7006 | 0.7069 |
| Mole fraction Siloxane blocks | 0.2994 | 0.2931 |
| Mole fraction P-T-P, theoretical | 0.4908 | 0.4997 |
| Mole fraction P-T-P, actual | 0.58 | 0.69 |
| Mole fraction P-T-S, theoretical | 0.4195 | 0.4144 |
| Mole fraction P-T-S, actual | 0.28 | 0.20 |
| Mole fraction S-T-S, theoretical | 0.0896 | 0.0859 |
| Mole fraction S-T-S, actual | 0.11 | 0.08 |
| Tensile Stress @ Break (MPa) | 22.79 | 54.96 |
| Tensile Elongation @ Break (%) | 2.84 | 15.76 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A method of preparing a poly(arylene ether)-polysiloxane multiblock copolymer, comprising:
  reacting
    a hydroxy-diterminated poly(arylene ether),
    a hydroxyaryl-diterminated polysiloxane, and
    an aromatic diacid chloride
  to form a poly(arylene ether)-polysiloxane multiblock copolymer.

2. The method of claim 1, wherein the hydroxy-diterminated poly(arylene ether) has an intrinsic viscosity of about 0.04 to about 0.2 deciliter per gram as measured at 25° C. in chloroform.

3. The method of claim 1, wherein the hydroxy-diterminated poly(arylene ether) has the structure

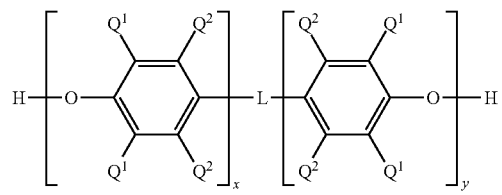

wherein x and y are each independently 0 to about 100, provided that the sum of x and y is at least 2; each occurrence of $Q^1$ is independently selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

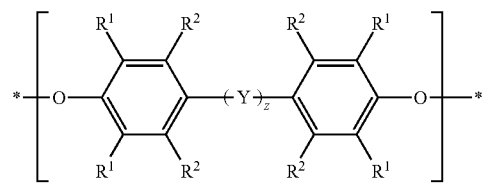

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

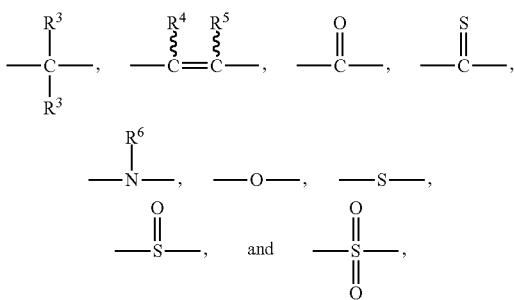

wherein each occurrence of $R^3$-$R^6$ is independently hydrogen or $C_1$-$C_{12}$ hydrocarbyl.

4. The method of claim 1, wherein the hydroxy-diterminated poly(arylene ether) has the structure

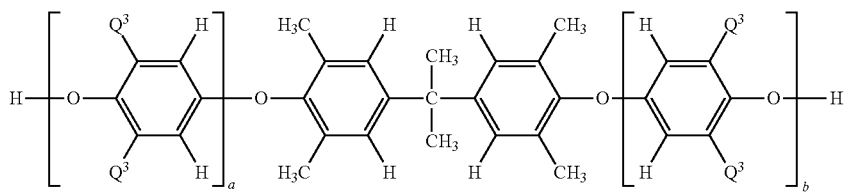

wherein each occurrence of $Q^3$ is independently methyl or di-n-butylaminomethyl; and each occurrence of a and b is independently 0 to about 100, provided that the sum of a and b is, on average, about 3 to about 100.

5. The method of claim 4, wherein the sum of a and b is, on average, about 4 to about 30.

6. The method of claim 1, wherein the hydroxyaryl-diterminated polysiloxane comprises a plurality of repeating units having the structure

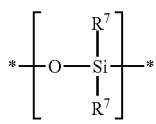

wherein each occurrence of $R^7$ is independently hydrogen, $C_1$-$C_{12}$ hydrocarbyl or $C_1$-$C_{12}$ halohydrocarbyl; and two terminal units having the structure

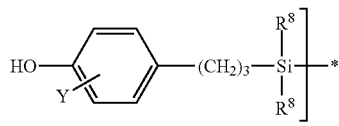

wherein Y is hydrogen, $C_1$-$C_{12}$ hydrocarbyl, $C_1$-$C_{12}$ hydrocarbyloxy, or halogen, and wherein each occurrence of $R^8$ is independently hydrogen, $C_1$-$C_{12}$ hydrocarbyl or $C_1$-$C_{12}$ halo hydrocarbyl.

7. The method of claim 1, wherein the hydroxyaryl-diterminated polysiloxane has the structure

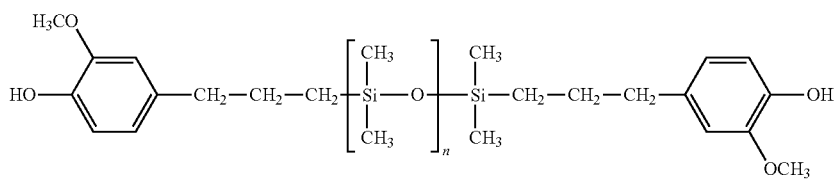

wherein n is, on average, about 5 to about IOU.

8. The method of claim 7, wherein n is, on average, about 5 to about 15.

9. The method of claim 1, wherein the hydroxy-diterminated poly(arylene ether) and the hydroxyaryl-diterminated polysiloxane are reacted in a weight ratio of about 0.1:1 to about 10:1.

10. The method of claim 1, wherein the aromatic diacid chloride is selected from the group consisting of terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof.

11. The method of claim 1, wherein the aromatic diacid chloride comprises terephthaloyl chloride.

12. The method of claim 1, wherein the aromatic diacid chloride is used in an amount sufficient to provide a molar ratio of acid chloride groups to hydroxy groups of about 0.9:1 to 1.05:1.

13. The method of claim 1, wherein the reacting comprises
combining the hydroxy-diterminated poly(arylene ether) and the hydroxyaryl-diterminated polysiloxane; and
adding the aromatic diacid chloride to the combined hydroxy-diterminated poly(arylene ether) and hydroxyaryl-diterminated polysiloxane.

14. The method of claim 1, wherein the reacting comprises adding the aromatic diacid chloride and the hydroxyaryl-diterminated polysiloxane to the hydroxy-diterminated poly(arylene ether).

15. The method of claim 1, wherein the reacting comprises adding at least a portion of the aromatic diacid chloride to the hydroxy-diterminated poly(arylene ether), followed by adding at least a portion of the hydroxyaryl-diterminated polysiloxane to the hydroxy-diterminated poly(arylene ether) and the at least a portion of the aromatic diacid chloride.

16. The method of claim 1, wherein the reacting is conducted in the presence of tertiary amine.

17. The method of claim 16, wherein the tertiary amine comprises triethylamine.

18. The method of claim 1, wherein the poly(arylene ether)-polysiloxane multiblock copolymer has a number average molecular weight of about 5,000 to about 50,000 atomic mass units.

19. The method of claim 1, wherein the poly(arylene ether)-polysiloxane multiblock copolymer comprises at least two poly(arylene ether) blocks and at least two polysiloxane blocks.

20. The method of claim 1, wherein the poly(arylene ether)-polysiloxane multiblock copolymer comprises about 5 to about 25 poly(arylene ether) blocks and about 10 to about 30 polysiloxane blocks.

21. The method of claim 1, wherein the hydroxy-diterminated poly(arylene ether) has the structure

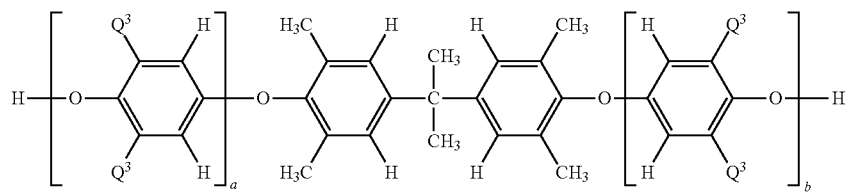

wherein each occurrence of $Q^3$ is independently methyl or di-n-butylaminomethyl; and each occurrence of a and b is independently 0 to about 15, provided that the sum of a and b is, on average, about 4 to about 15;

wherein the hydroxyaryl-diterminated polysiloxane has the structure

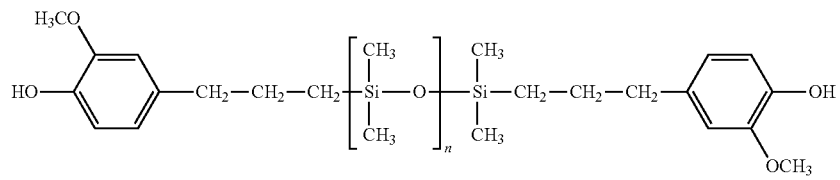

wherein n is, on average, about 5 to about 15;

wherein the aromatic diacid chloride comprises terephthaloyl chloride; and wherein the reacting is conducted in the presence of a tertiary amine.

22. A poly(arylene ether)-polysiloxane multiblock copolymer prepared by the method of claim 1.

23. A poly(arylene ether)-polysiloxane multiblock copolymer prepared by the method of claim 21.

24. A poly(arylene ether)-polysiloxane multiblock copolymer, comprising:

at least two poly(arylene ether) blocks having the structure

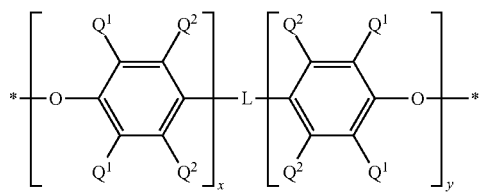

wherein x and y are each independently 0 to about 100, provided that the sum of x and y is at least 2; each occurrence of $Q^1$ is independently selected from the group consisting of halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; each occurrence of $Q^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; and L has the structure

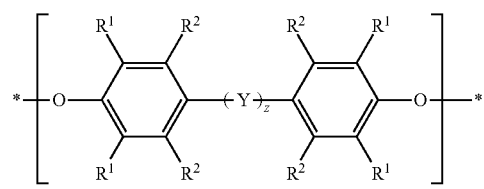

wherein each occurrence of $R^1$ and $R^2$ is independently selected from the group consisting of hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, and unsubstituted or substituted $C_1$-$C_{12}$ hydrocarbyl provided that the hydrocarbyl group is not tertiary hydrocarbyl; z is 0 or 1; and Y has a structure selected from the group consisting of

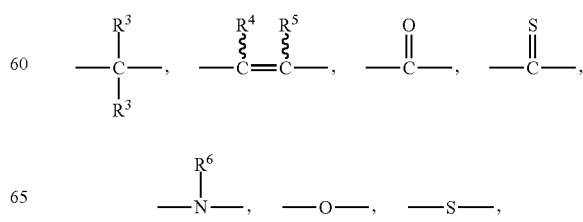

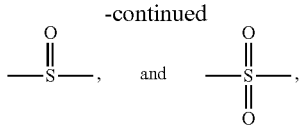

wherein each occurrence of $R^3$-$R^6$ is independently hydrogen or $C_1$-$C_{12}$ hydrocarbyl;

at least two polysiloxane blocks having the structure

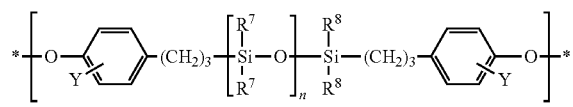

wherein each occurrence of $R^7$ is independently hydrogen, $C_1$-$C_{12}$ hydrocarbyl or $C_1$-$C_{12}$ halohydrocarbyl; Y is hydrogen, $C_1$-$C_{12}$ hydrocarbyl, $C_1$-$C_{12}$ hydrocarbyloxy, or halogen; each occurrence of $R^8$ is independently hydrogen, $C_1$-$C_{12}$ hydrocarbyl or $C_1$-$C_{12}$ halohydrocarbyl; and n is, on average, about 5 to about 100; and at least three block-linking groups, each block-linking group being the residue of an aromatic diacid chloride.

25. The poly(arylene ether)-polysiloxane multiblock copolymer of claim 24, wherein the at least two poly(arylene ether) blocks each independently have the structure

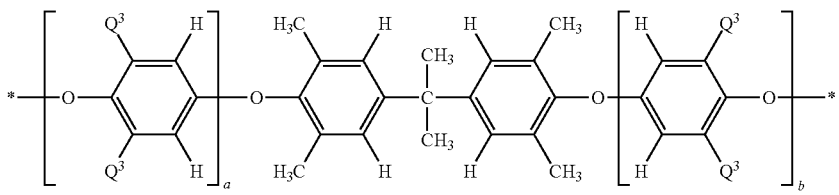

wherein each occurrence of $Q^3$ is independently methyl or di-n-butylaminomethyl; and each occurrence of a and b is independently 0 to about 100, provided that the sum of a and b is, on average, about 3 to about 100.

26. The poly(arylene ether)-polysiloxane multiblock copolymer of claim 24, wherein the at least two polysiloxane blocks have the structure

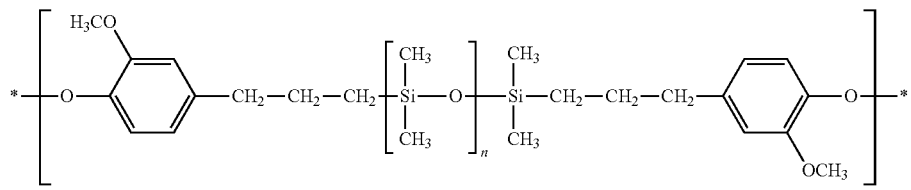

wherein n is, on average, about 5 to about 15.

27. The poly(arylene ether)-polysiloxane multiblock copolymer of claim 24, wherein the aromatic diacid chloride is selected from the group consisting of terephthaloyl chloride, isophthaloyl chloride, 4,4'-biphenyldicarbonyl chloride, 3,3'-biphenyldicarbonyl chloride, 3,4'-biphenyldicarbonyl chloride, 4,4'-oxybis(benzoyl chloride), 3,3'-oxybis(benzoyl chloride), 3,4'-oxybis(benzoyl chloride), 4,4'-sulfonylbis(benzoyl chloride), 3,3'-sulfonylbis(benzoyl chloride), 3,4'-sulfonylbis(benzoyl chloride), naphthalene-2,6-dicarbonyl chloride, and mixtures thereof.

28. The poly(arylene ether)-polysiloxane multiblock copolymer of claim 24, wherein the aromatic diacid chloride comprises terephthaloyl chloride.

29. The poly(arylene ether)-polysiloxane multiblock copolymer of claim 24, having a number average molecular weight of about 5,000 to about 50,000 atomic mass units.

30. The poly(arylene ether)-polysiloxane multiblock copolymer of claim 24, comprising about 5 to about 25 poly(arylene ether) blocks and about 10 to about 30 polysiloxane blocks.

31. The poly(arylene ether)-polysiloxane multiblock copolymer of claim 24, wherein at least 10 percent of the block-linking groups link a poly(arylene ether) block and a polysiloxane block.

32. The poly(arylene ether)-polysiloxane multiblock copolymer of claim 24, wherein the at least two poly(arylene ether) blocks have the structure

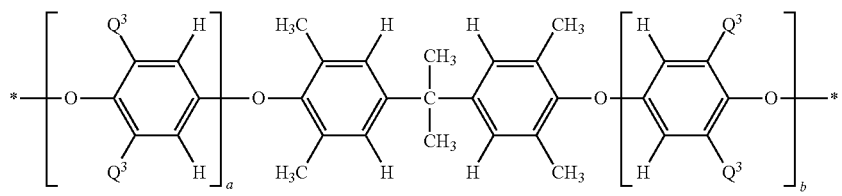

wherein each occurrence of $Q^3$ is independently methyl or di-n-butylaminomethyl; and each occurrence of a and b is independently 0 to about 15, provided that the sum of a and b is, on average, about 4 to about 15;

wherein the at least two polysiloxane blocks have the structure

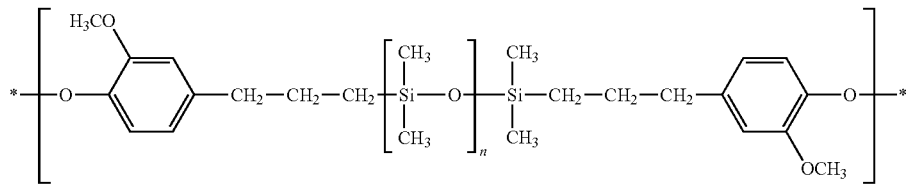

wherein n is, on average, about 5 to about 15; and wherein the at least three block-linking groups have the structure

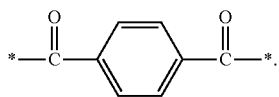

33. A composition, comprising:

the poly(arylene ether)-polysiloxane multiblock copolymer of claim 24; and an other polymer selected from the group consisting of poly(arylene ether)s, styrenic polymers, polyamides, polyolefins, poly(phenylene sulfide)s, and mixtures thereof.

34. An article comprising the poly(arylene ether)-polysiloxane multiblock copolymer of claim 22.

35. An article comprising the poly(arylene ether)-polysiloxane multiblock copolymer of claim 23.

36. An article comprising the poly(arylene ether)-polysiloxane multiblock copolymer of claim 24.

37. An article comprising the poly(arylene ether)-polysiloxane multiblock copolymer of claim 32.

38. An article comprising the composition of claim 33.

* * * * *